United States Patent [19]

Eida et al.

[11] Patent Number: 5,466,282
[45] Date of Patent: Nov. 14, 1995

[54] AZO DYE COMPOUND, INK CONTAINING THE SAME, AND RECORDING METHOD AND INSTRUMENT USING THE INK

[75] Inventors: Tsuyoshi Eida, Yokohama; Osamu Nishiwaki, Atsugi; Takao Yamamoto, Isehara; Kumiko Mafune, Kawasaki, all of Japan

[73] Assignee: Canon Kabushiki Kaisha, Tokyo, Japan

[21] Appl. No.: 241,592

[22] Filed: May 12, 1994

[30] Foreign Application Priority Data

| May 18, 1993 | [JP] | Japan | 5-116075 |
| May 18, 1993 | [JP] | Japan | 5-116076 |
| May 18, 1993 | [JP] | Japan | 5-116185 |
| May 18, 1993 | [JP] | Japan | 5-116186 |

[51] Int. Cl.$^6$ ............................................. C09D 11/02
[52] U.S. Cl. ............ 106/22 K; 106/20 D; 534/796; 534/797; 534/798; 534/801; 534/803; 534/804
[58] Field of Search ............... 106/22 K, 20 D; 534/796, 797, 798, 801, 803, 804, 784

[56] References Cited

U.S. PATENT DOCUMENTS

| 3,261,826 | 7/1966 | Andrew | 534/803 |
| 4,083,840 | 4/1978 | Schoefberger | 534/797 |
| 4,557,761 | 12/1985 | Kobayashi et al. | 106/22 K |
| 4,636,284 | 12/1986 | Ohta et al. | 106/22 K |
| 4,661,158 | 4/1987 | Kobayashi et al. | 106/22 K |
| 4,764,175 | 8/1988 | Dore et al. | 534/797 |
| 4,771,129 | 9/1988 | Kawashita et al. | 534/803 |
| 4,804,411 | 2/1989 | Eida et al. | 106/22 K |
| 4,864,324 | 9/1989 | Shirota et al. | 346/1.1 |
| 5,017,227 | 5/1991 | Koike et al. | 106/22 K |

(List continued on next page.)

FOREIGN PATENT DOCUMENTS

| 0345763 | 12/1989 | European Pat. Off. . |
| 0415581 | 3/1991 | European Pat. Off. . |
| 0440084 | 8/1991 | European Pat. Off. . |
| 0539178 | 4/1993 | European Pat. Off. . |
| 2814802 | 10/1978 | Germany | 534/803 |
| 54-154605 | 12/1979 | Japan . |
| 55-145773 | 11/1980 | Japan . |
| 55-151072 | 11/1980 | Japan . |
| 57-59969 | 4/1982 | Japan . |
| 58-101171 | 6/1983 | Japan . |

(List continued on next page.)

OTHER PUBLICATIONS

Patent Abstracts of Japan, Unexamined Applications, C field, vol. 10, No. 144, p. 46, C349 (May 27, 1986) for JP-A-61-2773.
Patent Abstracts of Japan, Unexamined Applications, C field, vol. 10, No. 144, p. 47, C349 (May 27, 1986) for JP-A-61-2774.
Patent Abstracts of Japan, Unexamined Applications, C field, vol. 10, No. 144, p. 47, C349 (May 27, 1986) for JP-A-61-2776.

*Primary Examiner*—Helene Klemanski
*Attorney, Agent, or Firm*—Fitzpatrick, Cella, Harper & Scinto

[57] ABSTRACT

Disclosed herein is a monoazo dye compound having a structural unit represented by the following formula in its molecule:

$$-X-Y-(R_1)(R_2)(R_3)_k \quad [I]$$

wherein Y is a 6-membered ring containing 2 or 3 nitrogen atoms, X is a linking group for bonding a main body of the dye molecule to Y, $R_1$ is the first amino acid residue, $R_2$ is an atomic group selected from the following group A, $R_3$ is another atomic group selected from the following group BB, and k is a number of 0 or 1:

Group A: H, OH, $NH_2$, CN, =O and the second amino acid residue;

Group BB: H, OH, $NH_2$, CN and =O, the first and second amino acid residues being identical with or different from each other.

47 Claims, 3 Drawing Sheets

U.S. PATENT DOCUMENTS

| | | | |
|---|---|---|---|
| 5,078,790 | 1/1992 | Tochihara et al. | 106/20 R |
| 5,080,716 | 1/1992 | Aoki et al. | 106/20 R |
| 5,082,496 | 1/1992 | Yamamoto et al. | 106/22 K |
| 5,110,356 | 5/1992 | Shirota et al. | 106/22 K |
| 5,118,737 | 6/1992 | Baxter et al. | 106/22 K |
| 5,123,960 | 6/1992 | Shirota et al. | 106/22 K |
| 5,125,969 | 6/1992 | Nishiwaki et al. | 106/22 K |
| 5,127,946 | 7/1992 | Eida et al. | 106/22 K |
| 5,127,947 | 7/1992 | Takimoto et al. | 106/22 K |
| 5,131,949 | 7/1992 | Tochihara et al. | 106/20 R |
| 5,135,570 | 8/1992 | Eida et al. | 106/22 K |
| 5,135,571 | 8/1992 | Shirota et al. | 106/22 K |
| 5,139,573 | 8/1992 | Yamamoto et al. | 106/33 |
| 5,167,703 | 12/1992 | Eida et al. | 106/22 K |
| 5,177,195 | 1/1993 | Gregory et al. | 106/22 K |
| 5,178,671 | 1/1993 | Yamamoto et al. | 106/22 K |
| 5,203,912 | 4/1993 | Greenwood et al. | 106/22 K |
| 5,213,613 | 5/1993 | Nagashima et al. | 106/20 R |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,216,437 | 6/1993 | Yamamoto et al. | 346/1.1 |
| 5,258,505 | 11/1993 | Eida et al. | 534/680 |

FOREIGN PATENT DOCUMENTS

| | | |
|---|---|---|
| 58-141257 | 8/1983 | Japan . |
| 59-75966 | 4/1984 | Japan . |
| 59-64677 | 4/1984 | Japan . |
| 59-78273 | 5/1984 | Japan . |
| 59-100164 | 6/1984 | Japan . |
| 59-131657 | 7/1984 | Japan . |
| 60-81266 | 5/1985 | Japan . |
| 60-81265 | 5/1985 | Japan . |
| 60-188468 | 9/1985 | Japan . |
| 61-2776 | 1/1986 | Japan . |
| 61-2773 | 1/1986 | Japan . |
| 61-2774 | 1/1986 | Japan . |
| 61-57666 | 3/1986 | Japan . |
| 61-62562 | 3/1986 | Japan . |
| 61-43673 | 3/1986 | Japan . |
| 61-171780 | 8/1986 | Japan . |
| 61-225267 | 10/1986 | Japan . |
| 61-261377 | 11/1986 | Japan . |
| 61-247770 | 11/1986 | Japan . |
| 61-285276 | 12/1986 | Japan . |
| 62-50371 | 3/1987 | Japan . |
| 62-201978 | 9/1987 | Japan . |
| 63-137975 | 6/1988 | Japan . |
| 63-213582 | 9/1988 | Japan . |
| 63-289079 | 11/1988 | Japan . |
| 64-48873 | 2/1989 | Japan . |
| 64-54082 | 3/1989 | Japan . |
| 1-141966 | 6/1989 | Japan . |
| 1-165678 | 6/1989 | Japan . |
| 1-210464 | 8/1989 | Japan . |
| 3-39372 | 2/1991 | Japan . |
| 3-91577 | 4/1991 | Japan . |
| 3-91576 | 4/1991 | Japan . |
| 3-167270 | 7/1991 | Japan . |
| 3-200882 | 9/1991 | Japan . |
| 3-294366 | 12/1991 | Japan . |
| 4-108865 | 4/1992 | Japan . |
| 4-136077 | 5/1992 | Japan . |
| 4-175384 | 6/1992 | Japan . |
| 4-202573 | 7/1992 | Japan . |
| 4-202571 | 7/1992 | Japan . |
| 4-220472 | 8/1992 | Japan . |
| 2151250 | 7/1985 | United Kingdom . |
| 2179361 | 3/1987 | United Kingdom . |

AZO DYE COMPOUND, INK CONTAINING THE SAME, AND RECORDING METHOD AND INSTRUMENT USING THE INK

BACKGROUND OF THE INVENTION

1. Field of the Invention

The present invention relates to novel azo dye compounds, inks separately containing such azo dye compounds as a recording agent, and an ink-jet recording method and an instrument using such an ink. More particularly, this invention relates to novel azo dye compounds suitable for use in the preparation of inks which can provide images high in optical density, scarcely cause feathering of dots and permit fast fixing and improved water fastness when printed on so-called plain paper such as woodfree paper, paper for copying, bond paper and paper for reporting, inks separately containing such dye compounds, and an ink-jet recording method and an instrument using such an ink.

2. Related Background Art

Water-based inks with a water-soluble dye dissolved in an aqueous medium have heretofore been used as inks for ink-jet recording. Such conventional inks are required to satisfy the following conditions:

(1) providing images sufficient in optical density;

(2) having good drying characteristics on a recording material;

(3) providing recorded images on which feathering scarcely occurs;

(4) providing recorded images free from running even when coming into contact with water, alcohol, etc., or sufficiently readable even when run out (high water fastness);

(5) providing recorded images excellent in light fastness:

(6) causing no clogging on the tip of a pen or nozzle;

(7) having no defects such as blurring of recorded images upon continuous recording or resumption of recording after being over for a long period of time (good ejection stability);

(8) being able to store stably;

(9) offering no problem even when coming into contact with parts constructing a recording means during use; and

(10) offering no problem about the safety of users. In addition, in an ink-jet recording system making use of thermal energy, the inks are required to satisfy the following conditions:

(11) having excellent heat resistance and not adversely affecting a means for generating thermal energy.

These properties or characteristics may of course vary according to the composition of ink, and also are greatly controlled by the nature of a dye contained as a recording agent. It is difficult to satisfy all the above requirements for performance by using existing dyes.

The conventional water-based inks for ink-jet recording have used principally existing acid or direct dyes. These dyes each have a sulfonic group as a solubilizing group, and hence are high in solubility in media for water-based inks, and hence, the long-term storability of inks containing such a dye is generally good. However, a print obtained by making a record with such an ink on a recording material such as paper or the like has undergone running of the dye and bleeding when it was splashed with water or touched with a wet finger, or characters on the print were rubbed with a water-based felt pen, so that the print has often been deteriorated in image quality and made illegible.

Japanese Patent Application Laid-Open Nos. 55-145773, 59-78273, 59-131657, 60-81266, 60-188468, 61-2773, 61-2774, 61-247770, 61-62562 and 63-213582, and moreover Japanese Patent Application Laid-Open Nos. 58-101171, 58-141257, 59-64677, 1-141966 and 4-52305 separately disclose inks the various properties of which have been improved by using a monoazo dye having a specified structure. However, the water fastness of recorded images formed with such inks is still insufficient.

Japanese Patent Application Laid-Open Nos. 55-151072, 59-100164, 61-2776, 61-57666, 61-261377, 3-39372 and 3-1576 separately disclose inks the various properties of which have been improved by using a disazo dye having a specified structure. However, the water fastness of recorded images formed with such inks is still insufficient.

Japanese Patent Application Laid-Open Nos. 54-154605, 59-75966, 61-171780, 61-225267, 61-285276, 62-50371, 62-201978, 63-137975, 63-289079, 64-48873, 64-54082, 1-165678, 1-210464, 3-167270, 3-200882, 4-108865, 4-175384, 4-202571 and 4-202573, and Japanese Patent Application Nos. 2-30662, 2-30663, 2-415359, 2-408933, 2-408934 and 3-16824 separately disclose inks the various properties of which have been improved by using a trisazo dye having a specified structure. However, the water fastness of recorded images formed with such inks is still insufficient.

Japanese Patent Application Laid-Open No. 57-59969 discloses a water-based ink using, as a colorant, an alkali metal salt of an amide derivative obtained by reacting an acid group of an acid dye with an aminocarboxylic acid. However, the process of such a reaction is complex and difficult, and so the production cost of the colorant becomes expensive. In order to well balance the solubility of the dye with the water fastness of the ink, it is also necessary to control the proportion of the number of sulfonic groups to the number of carboxyl groups in a molecule of the dye. It is however next to impossible for this process to provide such control. Japanese Patent Application Laid-Open No. 1-141966 discloses a water-based ink containing a dye in which a ratio of a carboxylate group to a sulfonate group in its molecule is 0.3 or higher, and these groups form salts with a quaternary ammonium or lithium. As apparent from the specific examples, the carboxyl group in this dye is bonded directly to an aromatic ring in its molecule. Besides, Japanese Patent Application Laid-Open No. 61-43673 discloses an ink containing a monoazo dye in which a carboxyl group is bonded directly to an aromatic ring. However, the use of these particular intermediates inevitably brings on a considerable increase in cost. In addition, such inks can stand improvement in the water fastness of images formed with the inks.

Japanese Patent Application Laid-Open No. 60-81265 discloses an ink-jet ink making use of a disazo dye having a carboxyl group. In this dye, 3 or 4 sulfonic groups are also introduced. Japanese Patent Application Laid-Open No. 3-91577 discloses an ink-jet ink making use of a disazo dye in which 2 carboxyl groups and 1 or 2 sulfonic groups are introduced to aromatic rings.

Japanese Patent Application Laid-Open No. 4-220472 and Japanese patent Application No. 3-16825 separately disclose a trisazo dye, in which 2 or more carboxyl groups are introduced into its molecule.

As described above, various devices have been made for improving various properties such as water fastness at the same time. The problems have not yet been solved in a satisfactory manner. Besides, there is a demand for development of an ink which can form dots free from feathering, substantially round in shape and sharp in edge and hence provide images high in quality, and an ink which permits fast fixing after recording for accommodating the speed-up of printers.

When during printing of a document or image having blank spaces, printing is suspended on nozzles corresponding to the blank spaces, the direction of the first ejection upon resumption of the printing tends to disorder, resulting in a print deteriorated in quality. Therefore, there is also a demand for development of an ink free from such a problem.

SUMMARY OF THE INVENTION

It is accordingly an object of the present invention to provide novel azo dye compounds which can provide images high in optical density, bright, free from undefined or irregular feathering and excellent in quality and water fastness on various types of plain paper when contained in inks as recording agents, permit the preparation of inks good in fixing ability, free from clogging and disorder of ejection direction in the course of printing and excellent in storage stability, heat stability and safety, and are low in production cost, and to provide inks separately containing such azo compounds, and an ink-jet recording method and an instrument using such an ink.

The above objects can be achieved by the present invention described below.

According to the present invention, there is thus provided a monoazo dye compound having a structural unit represented by the following formula in its molecule:

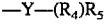

$$-X-Y-(R_1)(R_2)(R_3)_k \qquad [I]$$

wherein Y is a 6-membered ring containing 2 or 3 nitrogen atoms, X is a linking group for bonding a main body of the dye molecule to Y, $R_1$ is the first amino acid residue, $R_2$ is an atomic group selected from the following group A, $R_3$ is another atomic group selected from the following group BB, and k is a number of 0 or 1:

Group A: H, OH, $NH_2$, CN, $=O$ and the second amino acid residue;

Group BB: H, OH, $NH_2$, CN and $=O$, the first and second amino acid residues being identical with or different from each other.

According to the present invention, there is also provided an ink comprising a recording agent and a liquid medium dissolving or dispersing the recording agent therein, wherein the recording agent comprises a monoazo dye compound having a structural unit represented by the following formula in its molecule:

$$-X-Y-(R_1)(R_2)(R_3)_k \qquad [I]$$

wherein Y is a 6-membered ring containing 2 or 3 nitrogen atoms, X is a linking group for bonding a main body of the dye molecule to Y, $R_1$ is the first amino acid residue, $R_2$ is an atomic group selected from the following group A, $R_3$ is another atomic group selected from the following group BB, and k is a number of 0 or 1:

Group A: H, OH, $NH_2$, CN, $=O$ and the second amino acid residue;

Group BB: H, OH, $NH_2$, CN and $=O$, the first and second amino acid residues being identical with or different from each other.

According to the present invention, there is further provided a monoazo dye compound having a structural unit represented by the following formula in its molecule:

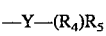

$$-Y-(R_4)R_5 \qquad [II]$$

wherein Y is a 6-membered ring containing 2 or 3 nitrogen atoms, $R_4$ is $-N(H)_m(CH_2CH_2OH)_{2-m}$, in which m is a number of 0 or 1, and $R_5$ is an amino acid residue containing a $-COOM$ group, in which M is an alkali metal or an ammonium.

According to the present invention, there is still further provided an ink comprising a recording agent and a liquid medium dissolving or dispersing the recording agent therein, wherein the recording agent comprises a monoazo dye compound having a structural unit represented by the following formula in its molecule:

$$-Y-(R_4)R_5 \qquad [II]$$

wherein Y is a 6-membered ring containing 2 or 3 nitrogen atoms, $R_4$ is $-N(H)_m(CH_2CH_2OH)_{2-m}$, in which m is a number of 0 or 1, and $R_5$ is an amino acid residue containing a $-COOM$ group, in which M is an alkali metal or an ammonium.

According to the present invention, there is yet still further provided a disazo dye compound represented by the following general formula:

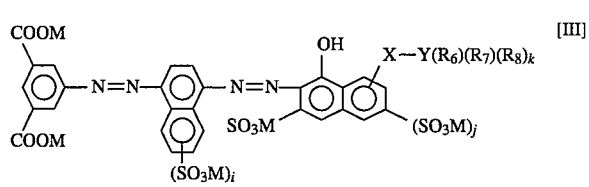

wherein Y is a 6-membered ring containing 2 or 3 nitrogen atoms, X is a linking group for bonding a main body of the dye molecule to Y, $R_6$ is $-N(H)_m(CH_2CH_2OH)_{2-m}$, in which m is a number of 0 or 1, $R_7$ is an atomic group selected from the following group FF, $R_8$ is another atomic group selected from the following group G, M is Na, K or ammonium, and i, j and k are individually a number of 0 or 1:

Group FF: H, OH, $NH_2$, CN, $=O$ and $-N(H)_n(CH_2CH_2OH)_{2-n}$, in which n is a number of 0 or 1;

Group G: H, OH, $NH_2$, CN and $=O$.

According to the present invention, there is yet still further provided an ink comprising a recording agent and a liquid medium dissolving or dispersing the recording agent therein, wherein the recording agent comprises a disazo dye represented by the following general formula:

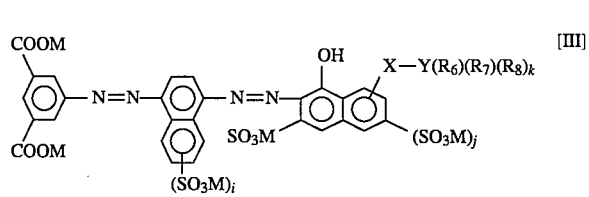

wherein Y is a 6-membered ring containing 2 or 3 nitrogen atoms, X is a linking group for bonding a main body of the dye molecule to Y, $R_6$ is $-N(H)_m(CH_2CH_2OH)_{2-m}$, in which m is a number of 0 or 1, $R_7$ is an atomic group selected from the following group FF, $R_8$ is another atomic group selected from the following group G, M is Na, K or ammonium, and i, j and k are individually a number of 0 or 1:

Group FF: H, OH, $NH_2$, CN, $=O$ and $-N(H)_n(CH_2CH_2OH)_{2-n}$, in which n is a number of 0 or 1;

Group G: H, OH, $NH_2$, CN and =O.

According to the present invention, there is yet still further provided a trisazo dye compound represented by the following general formula:

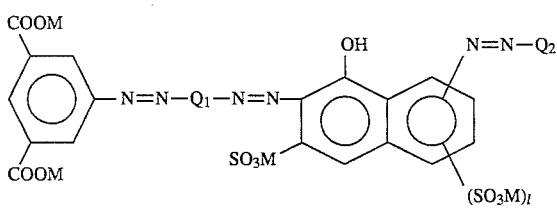

[IV]

wherein $Q_1$ is a p-phenylene group or 1,4-naphthylene group, each of which is unsubstituted or substituted by a group selected from the group consisting of $SO_3M$, COOM, $CH_3$, $OCH_3$, $NHCONH_2$ and $NHCOCH_3$, $Q_2$ is a p-phenylene group unsubstituted or substituted by a group selected from the group consisting of COOM, $CH_3$, $OCH_3$, $NHCONH_2$ and $NHCOCH_3$, Y is a 6-membered ring containing 2 or 3 nitrogen atoms, X is a linking group for bonding a main body of the dye molecule to Y, $R_9$ is $-N(H)_m(CH_2CH_2OH)_{2-m}$, in which m is a number of 0 or 1, $R_{10}$ is an atomic group selected from the following group J, $R_{11}$ is another atomic group selected from the following group KK, M is Na, K or ammonium, and k and l are individually a number of 0 or 1:

Group J: H, OH, $NH_2$, CN, =O and $-N(H)_n(CH_2CH_2OH)_{2-n}$, in which n is a number of 0 or 1;

Group KK: H, OH, $NH_2$, CN and =O.

According to the present invention, there is yet still further provided an ink comprising a recording agent and a liquid medium dissolving or dispersing the recording agent therein, wherein the recording agent comprises a trisazo dye represented by the following general formula:

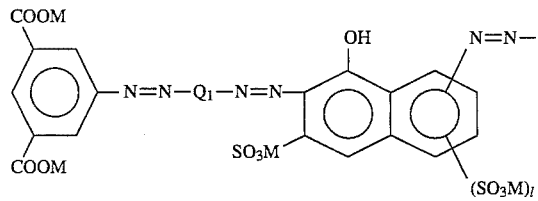

[IV]

wherein $Q_1$ is a p-phenylene group or 1,4-naphthylene group, each of which is unsubstituted or substituted by a group selected from the group consisting of $SO_3M$, COOM, $CH_3$, $OCH_3$, $NHCONH_2$ and $NHCOCH_3$, $Q_2$ is a p-phenylene group unsubstituted or substituted by a group selected from the group consisting of COOM, $CH_3$, $OCH_3$, $NHCONH_2$ and $NHCOCH_3$, Y is a 6-membered ring containing 2 or 3 nitrogen atoms, X is a linking group for bonding a main body of the dye molecule to Y, $R_9$ is $-N(H)_m(CH_2CH_2OH)_{2-m}$, in which m is a number of 0 or 1, $R_{10}$ is an atomic group selected from the following group J, $R_{11}$ is another atomic group selected from the following group KK, M is Na, K or ammonium, and k and l are individually a number of 0 or 1:

Group J: H, OH, $NH_2$, CN, =O and $-N(H)_n(CH_2CH_2OH)_{2-n}$, in which n is a number of 0 or 1;

Group KK: H, OH, $NH_2$, CN and =O.

According to the present invention, there is yet still further provided an ink-jet recording method comprising ejecting an ink in the form of ink droplets to make a record, wherein said ink is any one of the inks described above.

According to the present invention, there is yet still further provided a recording unit comprising an ink container portion with an ink held therein and a head from which the ink is ejected in the form of ink droplets, wherein said ink is any one of the inks described above.

According to the present invention, there is yet still further provided an ink cartridge comprising an ink container portion with an ink held therein, wherein said ink is any one of the inks described above.

According to the present invention, there is yet still further provided an ink-jet recording apparatus comprising a recording unit having an ink container portion with an ink held therein and a head from which the ink is ejected in the form of ink droplets, wherein said ink is any one of the inks described above.

According to the present invention, there is yet still further provided an ink-jet recording apparatus comprising an ink cartridge having an ink container portion with an ink held therein, and a recording head from which the ink is ejected in the form of ink droplets, wherein said ink is any one of the inks described above.

DESCRIPTION OF THE PREFERRED EMBODIMENTS

Figure 1:
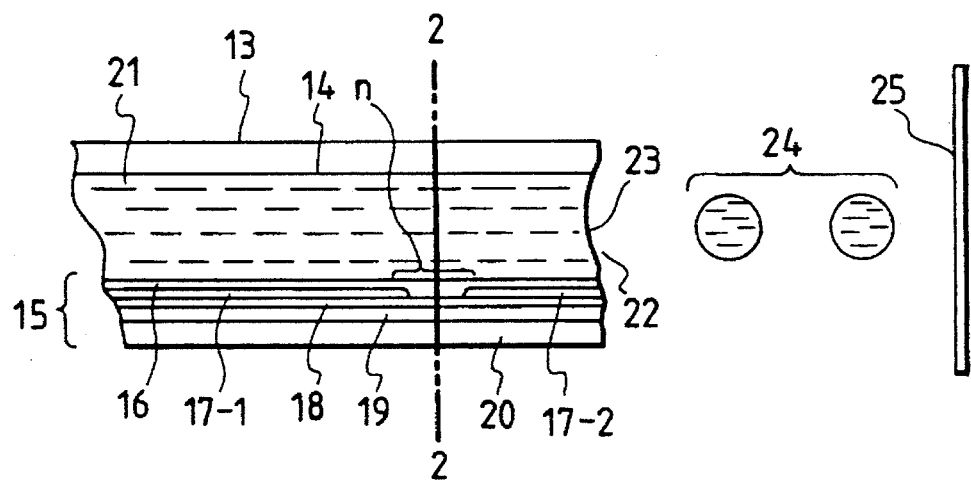
FIG. 1 is a longitudinal cross-sectional view of a head of an ink-jet recording apparatus.

The first aspect of the present invention is directed to a monoazo dye compound having a structural unit represented by the following formula in its molecule:

$$-X-Y-(R_1)(R_2)(R_3)_k \qquad [I]$$

wherein Y is a 6-membered ring containing 2 or 3 nitrogen atoms, X is a linking group for bonding a main body of the dye molecule to Y, $R_1$ is the first amino acid residue, $R_2$ is an atomic group selected from the following group A, $R_3$ is another atomic group selected from the following group BB, and k is a number of 0 or 1:

Group A: H, OH, $NH_2$, CN, $=O$ and the second amino acid residue;

Group BB: H, OH, $NH_2$, CN and $=O$, wherein the first and second amino acid residues may be identical with or different from each other.

The first aspect is also directed to an ink comprising a recording agent and a liquid medium dissolving or dispersing the recording agent therein, wherein the recording agent comprises a monoazo dye compound having a structural unit represented by the formula [I] in its molecule, and an ink-jet recording method and an instrument using such an ink.

The second aspect of the present invention is directed to a monoazo dye compound having a structural unit represented by the following formula in its molecule:

$$-Y-(R_4)R_5 \qquad [II]$$

wherein Y is a 6-membered ring containing 2 or 3 nitrogen atoms, $R_4$ is $-N(H)_m(CH_2CH_2OH)_{2-m}$, in which m is a number of 0 or 1, and $R_5$ is an amino acid residue containing a $-COOM$ group, in which M is an alkali metal or an ammonium.

The second aspect is also directed to an ink comprising a recording agent and a liquid medium for dissolving or dispersing the recording agent therein, wherein the recording agent comprises a monoazo dye compound having a structural unit represented by the formula [II] in its molecule, and an ink-jet recording method and an instrument using such an ink.

The third aspect of the present invention is directed to a disazo dye compound represented by the following general formula:

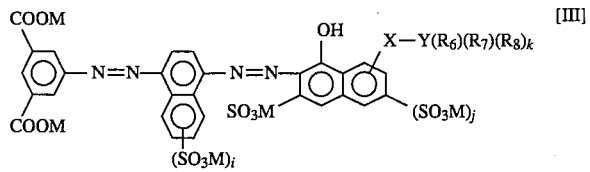

[III]

wherein Y is a 6-membered ring containing 2 or 3 nitrogen atoms, X is a linking group for bonding a main body of the dye molecule to Y, $R_6$ is $-N(H)_m(CH_2CH_2OH)_{2-m}$, in which m is a number of 0 or 1, $R_7$ is an atomic group selected from the following group FF, $R_8$ is another atomic group selected from the following group G, M is Na, K or ammonium, and i, j and k are individually a number of 0 or 1:

Group FF: H, OH, $NH_2$, CN, $=O$ and $-N(H)_n(CH_2CH_2OH)_{2-n}$, in which n is a number of 0 or 1;

Group G: H, OH, $NH_2$, CN and $=O$.

The third aspect is also directed to an ink comprising a recording agent and a liquid medium dissolving or dispersing the recording agent therein, wherein the recording agent comprises a disazo dye represented by the formula [III], and an ink-jet recording method and an instrument using such an ink.

The fourth aspect of the present invention is directed to a trisazo dye compound represented by the following general formula:

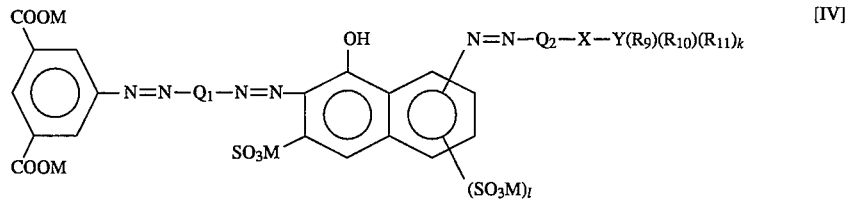

[IV]

wherein $Q_1$ is a p-phenylene group or 1,4-naphthylene group, each of which is unsubstituted or substituted by a group selected from the group consisting of $SO_3M$, COOM, $CH_3$, $OCH_3$, $NHCONH_2$ and $NHCOCH_3$, $Q_2$ is a p-phenylene group unsubstituted or substituted by a group selected from the group consisting of COOM, $CH_3$, $OCH_3$, $NHCONH_2$ and $NHCOCH_3$, Y is a 6-membered ring containing 2 or 3 nitrogen atoms, X is a linking group for bonding a main body of the dye molecule to Y, $R_9$ is $-N(H)_m(CH_2CH_2OH)_{2-m}$, in which m is a number of 0 or 1, $R_{10}$ is an atomic group selected from the following group J, $R_{11}$ is another atomic group selected from the following group KK, M is Na, K or ammonium, and k and l are individually a number of 0 or 1:

Group J: H, OH, $NH_2$, CN, $=O$ and $-N(H)_n(CH_2CH_2OH)_{2-n}$, in which n is a number of 0 or 1;

Group KK: H, OH, $NH_2$, CN and $=O$.

The fourth aspect is also directed to an ink comprising a recording agent and a liquid medium dissolving or dispersing the recording agent therein, wherein the recording agent comprises a trisazo dye represented by the formula [IV], and an ink-jet recording method and an instrument using such an ink.

According to the present invention, there are provided novel azo dye compounds suitable for use in the preparation of inks which can provide images high in optical density and quality, scarcely cause irregular feathering of dots and permit fast fixing and improved water fastness when printed on so-called plain paper such as woodfree paper, paper for copying, bond paper and paper for reporting, inks separately containing such dye compounds, and an ink-jet recording method and an instrument using such an ink.

The reason why such good results can be achieved is believed to be attributed to the fact that a group of the dyes according to the present invention has a higher affinity for cellulose in paper than conventional dyes. Therefore, when printing is conducted with an ink making use of such a dye, the dye does not penetrate together with a liquid medium in the interior of paper, but remains in the vicinity of the surface of the paper. As a result, such advantages that optical density is high, feathering of dots scarcely occurs and fixing speed is fast are obtained in addition to high water fastness.

The inks according to the present invention have the following excellent characteristics. If the liquid medium in each of the inks evaporates on the tip of a nozzle during long-term suspension of printing to deposit the dye contained in the ink, the deposit becomes a semisolid like jelly, so that the deposit does not crust in the form of crystals. Therefore, the deposit is easily removed by the operation of a recovery pump contained in a printer, and hence forms no cause of clogging at the nozzle. In addition, the inks are characterized in that the ejection in the wrong direction is unlikely to occur upon the first ejection (intermittent ejection) of the ink after the intermission of printing.

The present invention will hereinafter be described in more detail by the following preferred embodiments.

As preferred specific examples of the monoazo dye compound principally constituting a characteristic feature of the first aspect of the present invention, may be mentioned the following compounds:

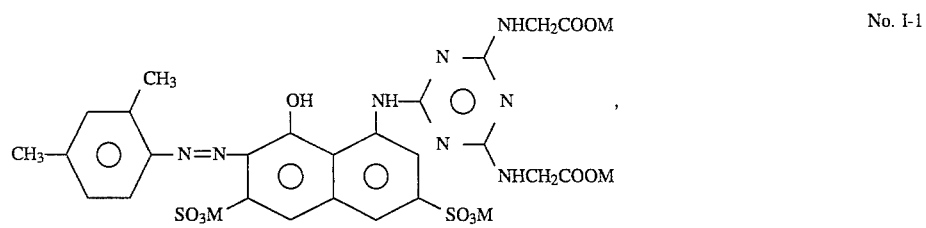

No. I-1

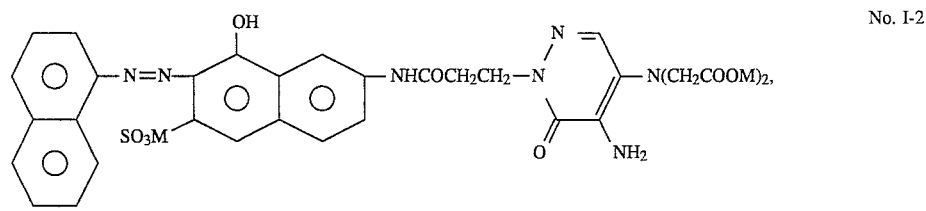

No. I-2

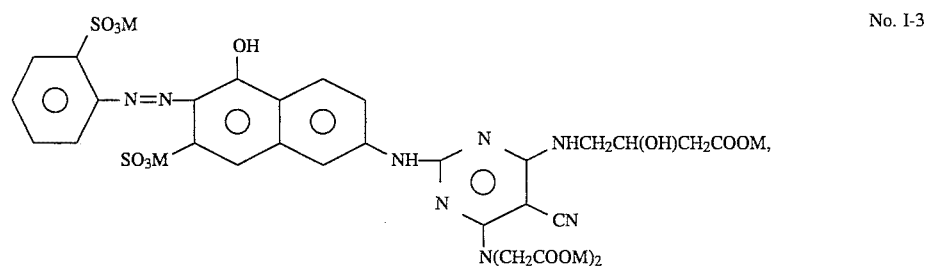

No. I-3

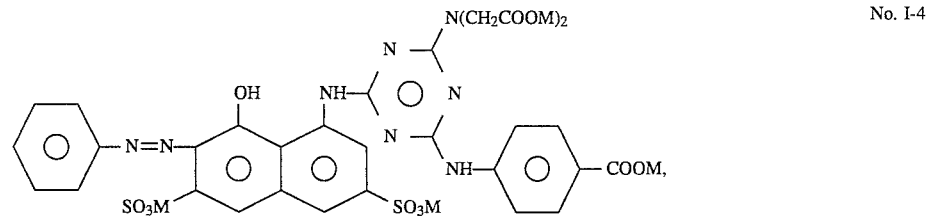

No. I-4

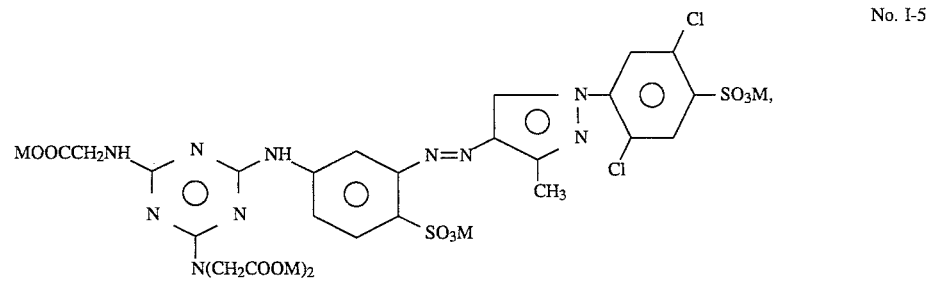

No. I-5

-continued

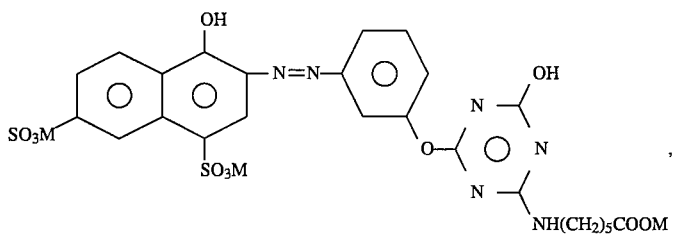 No. I-6

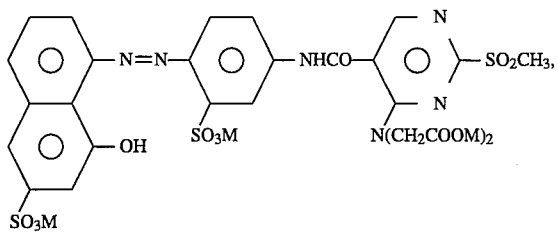 No. I-7

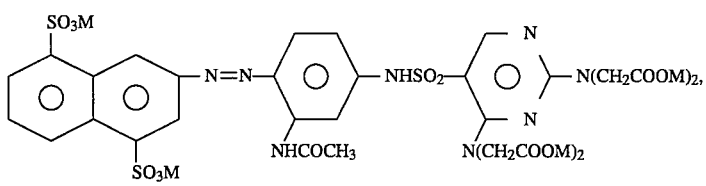 No. I-8

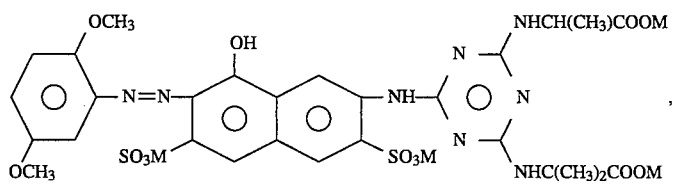 No. I-9

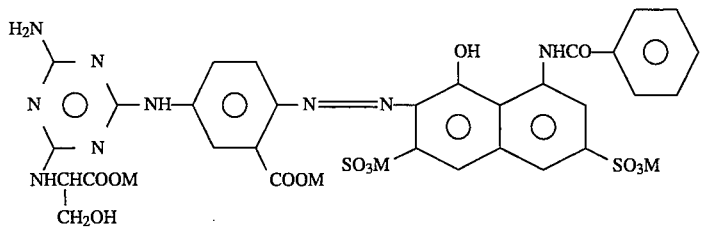 No. I-10 and

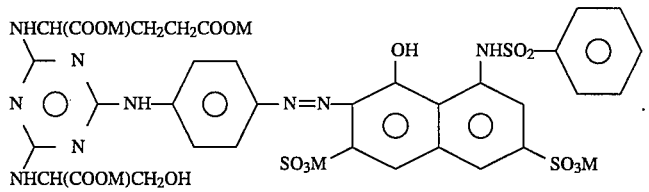 No. I-11

In the above structural formulae, M is Na, K or ammonium. Although all of them are preferred, the ammonium ion is particularly effective from the viewpoint of the improvement of water fastness because the ammonium ion bonded to a carboxyl group gradually vaporizes in the form of ammonia after printing, so that the dye remains in the form of a free acid which is hardly soluble or insoluble in water.

The dye compound preferably has 1 or 2 sulfonic groups per molecule from the viewpoint of the stability to dissolution of the dye. At this time, however, it is preferable from the viewpoint of exhibiting good water fastness that the number of the carboxyl groups be no fewer than that of the sulfonic groups. More preferably, the number of the carboxyl groups and the compound has 1 to 4 carboxyl groups exceeds that of the sulfonic groups.

The dyes according to the first aspect of the present invention as described above may be synthesized in accordance with the process described in Yutaka Hosoda, "Riron Seizo: Senryo Kagaku (Theory and Preparation: Dyestuff Chemistry)" or the like. For example, the dye of Specific Example No. I-1 is synthesized in the following manner. 2,4-Dimethylaniline is diazotized with sodium nitrite in accordance with a method known per se in the art. The resulting diazotized compound is coupled with H-acid (1-amino-8-naphthol-3,6-disulfonic acid) under alkaline conditions. The thus-formed product is then reacted with cyanuric chloride at about 0° to 10° C. Finally, this reaction product is reacted with a twofold mol of glycine at 50° to 90° C., thereby obtaining the intended compound.

As described above, the number of carboxyl groups introduced in a molecule of the dye according to the first aspect of the present invention can be strictly controlled. In addition, it can be produced at a low cost because the existing intermediate is used.

As preferred specific examples of the monoazo dye compound principally constituting a characteristic feature of the second aspect of the present invention, may be mentioned the following compounds:

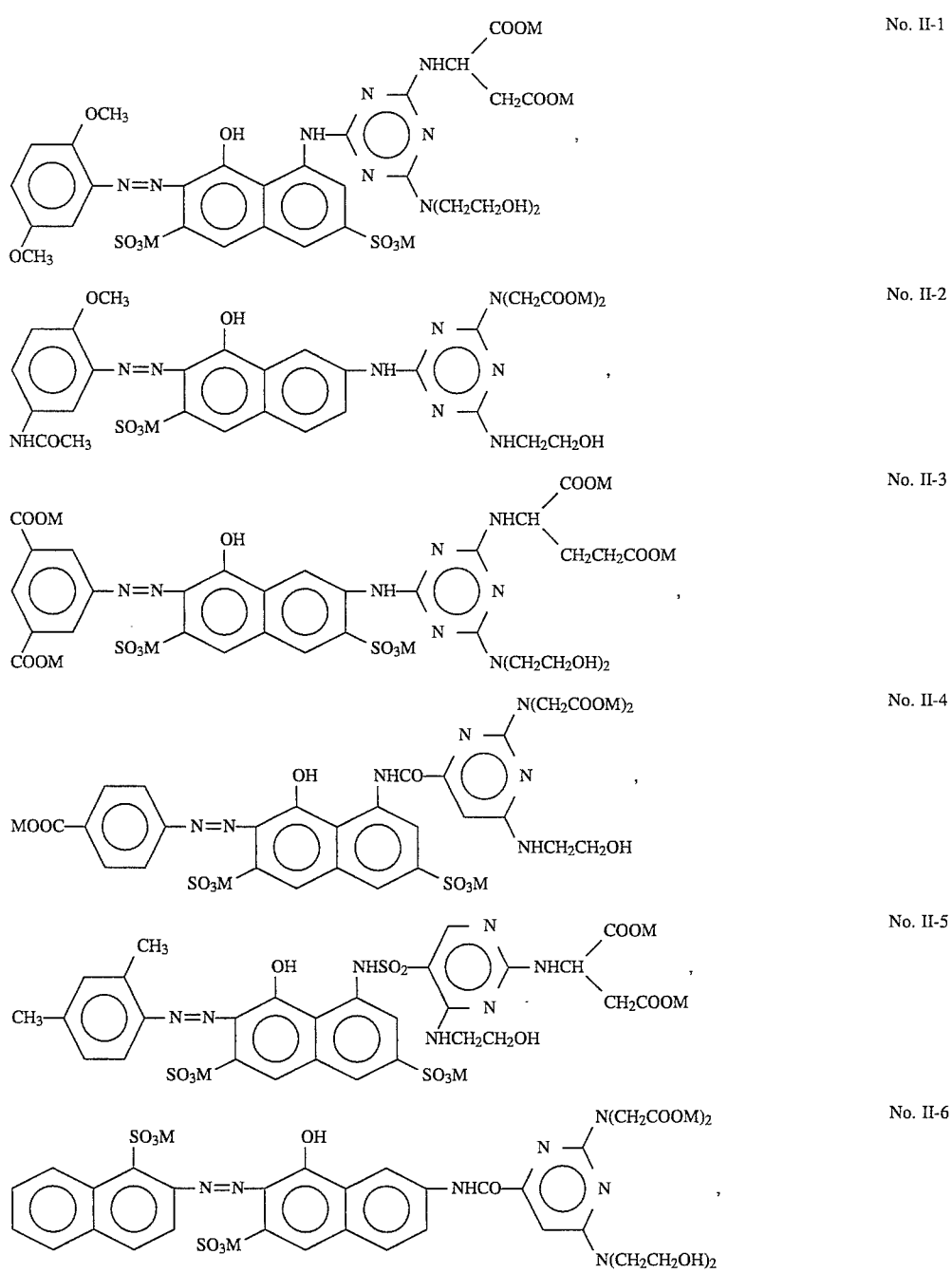

-continued

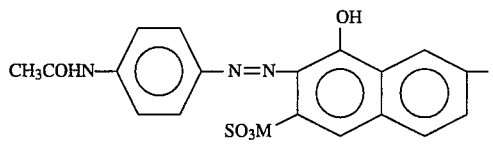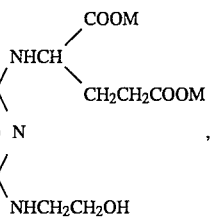      No. II-7

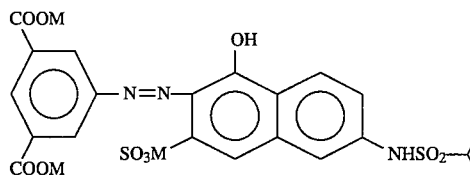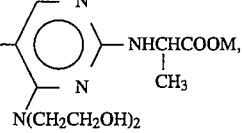      No. II-8

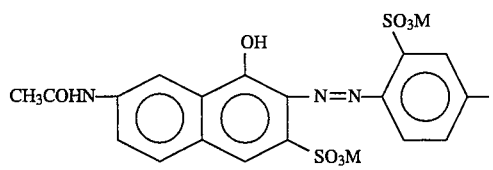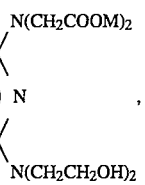      No. II-9

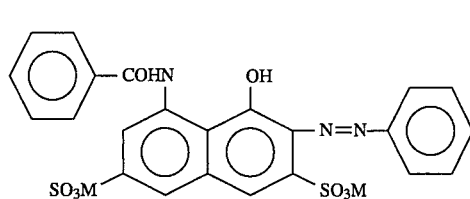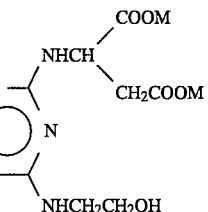      No. II-10 and

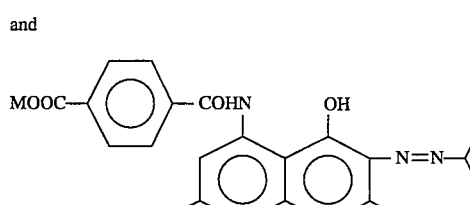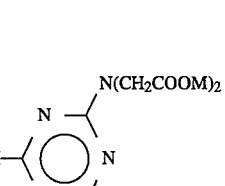      No. II-11

In the above structural formulae, M is an alkali metal or an ammonium ion. Although both are preferred, the ammonium ion is particularly effective from the viewpoint of the improvement of water fastness of the resulting print because the ammonium ion bonded to a carboxyl group gradually vaporizes in the form of ammonia after printing, so that the dye remains in the form of a free acid which is hardly soluble or insoluble in water. Those dyes in which M is lithium are disadvantageous from the viewpoint of water fastness because they are more soluble in water than other dyes.

Carboxyl groups may exist not only in the amino acid residue of $R_5$ in the general formula [II], but also at other positions in the dye molecule. The number of the carboxyl groups is preferably 2 or 3 from the viewpoint of exhibiting good water fastness. Most preferably, the number of the carboxyl groups is not fewer than that of sulfonic groups and most preferably the compound has 2 to 4 carboxyl groups and 1 or 2 sulfonic groups.

The hydroxyethylamino group of $R_4$ has a great effect from the viewpoint of enhancing the performance characteristics such as anti-clogging and ejection stability to re-ejection after the suspension of printing as described above.

The dye compound according to the second aspect of the present invention is characterized by having both carboxyl and hydroxyethylamino groups, which have the above-described effects, not on the main skeletal structure thereof, but on portions of the dye molecule through a group such as a triazine ring. The dye structure according to the second aspect of the present invention affects the properties of the dye itself such as color tone and light fastness to a far less extent compared with the case where these groups are introduced directly to the main skeletal structure. Therefore, if a main structure having suitable properties is first selected, and the structural unit according to the second aspect of the present invention is introduced into the main structure, the water fastness can be improved without adversely affecting the other properties.

The dyes according to the second aspect of the present invention as described above may be synthesized in accordance with the process described in Yutaka Hosoda, "Riron Seizo: Senryo Kagaku (Theory and Preparation: Dyestuff Chemistry)" or the like.

For example, the dye of Specific Example No. II-1 is synthesized in the following manner. 2,5-Dimethoxyaniline is diazotized with sodium nitrite in accordance with a method known per se in the art. The resulting diazotized compound is coupled with H-acid under alkaline conditions. The thus-formed product is then reacted with cyanuric chloride at about 0° to 10° C., followed by the reaction with aspartic acid at room temperature to 40° C. Finally, this reaction product is reacted with diethanolamine at 70° to 90° C., thereby obtaining the intended compound.

As described above, the number of carboxyl groups introduced in a molecule of the dye according to the second aspect of the present invention can be strictly controlled. In addition, it can be produced at a low cost because the existing intermediate is used.

As preferred specific examples of the disazo dye compound principally constituting a characteristic feature of the third aspect of the present invention, may be mentioned the following compounds:

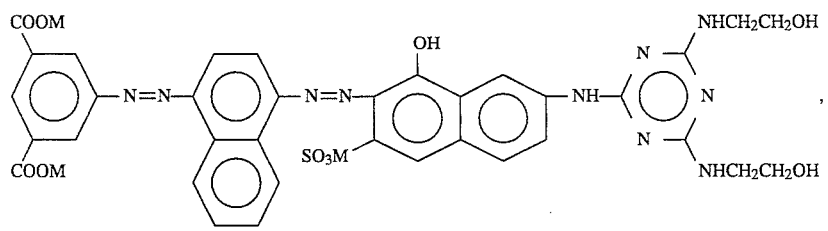

No. III-1

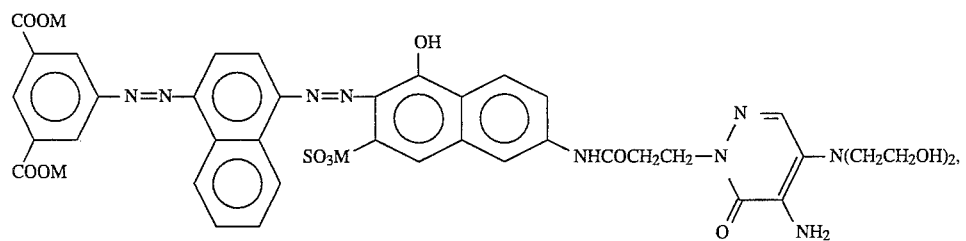

No. III-2

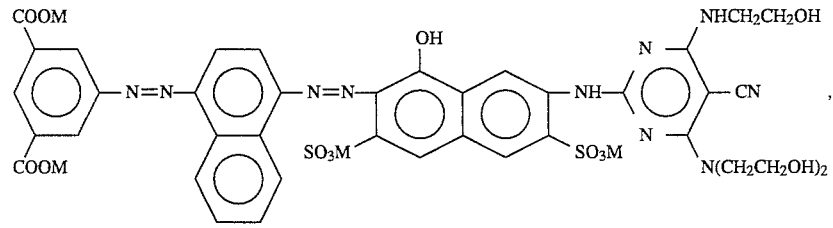

No. III-3

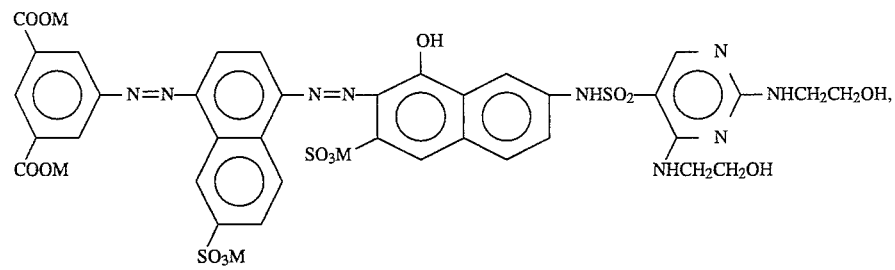

No. III-4

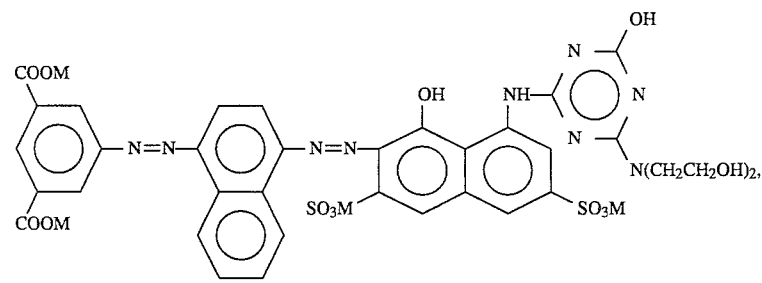

No. III-5

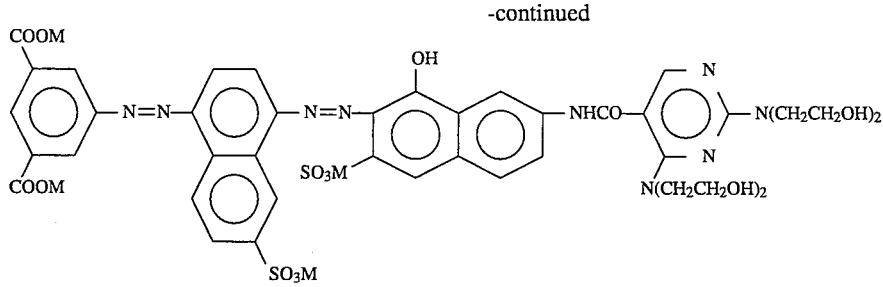

No. III-6 and

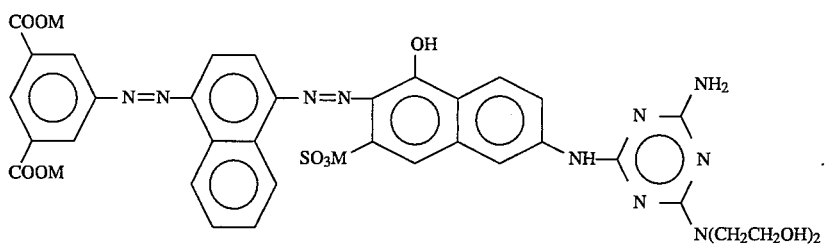

No. III-7

In the above structural formulae, M is Na, K or ammonium. Although all of them are preferred, the ammonium ion is particularly effective from the viewpoint of the improvement of water fastness because the ammonium ion bonded to a carboxyl group gradually vaporizes in the form of ammonia after printing, so that the dye remains in the form of a free acid which is hardly soluble or insoluble in water.

The dye compound preferably has 1 or 2 sulfonic groups per molecule from the viewpoint of the stability to dissolution of the dye. At this time, however, it is preferable from the viewpoint of exhibiting good water fastness that the number of the carboxyl groups be no fewer than that of the sulfonic groups. More preferably, the number of the carboxyl groups exceeds that of the sulfonic groups.

The dyes according to the third aspect of the present invention as described above may be synthesized in accordance with the process described in Yutaka Hosoda, "Riron Seizo: Senryo Kagaku (Theory and Preparation: Dyestuff Chemistry)" or the like. For example, the dye of Specific Example No. III-1 is synthesized in the following manner. Aniline-3,5-dicarboxylic acid is diazotized with sodium nitrite in accordance with a method known per se in the art. The resulting diazotized compound is coupled with 1-naphthylamine at pH 4 to 6. The resulting product is diazotized again to couple it with gamma acid at pH 8 to 10. The resultant disazo product is then reacted with cyanuric chloride at 0° to 10° C. Finally, this reaction product is reacted with a twofold mol of monoethanolamine at 50° to 90° C., thereby obtaining the intended compound.

As described above, the number of carboxyl groups introduced in a molecule of the dye according to the third aspect of the present invention can be strictly controlled. In addition, it can be produced at a low cost because the existing intermediate is used.

As preferred specific examples of the trisazo dye compound principally constituting a characteristic feature of the fourth aspect of the present invention, may be mentioned the following compounds:

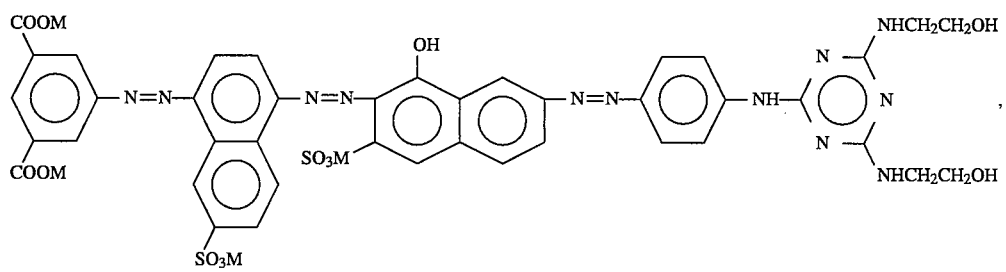

No. IV-1

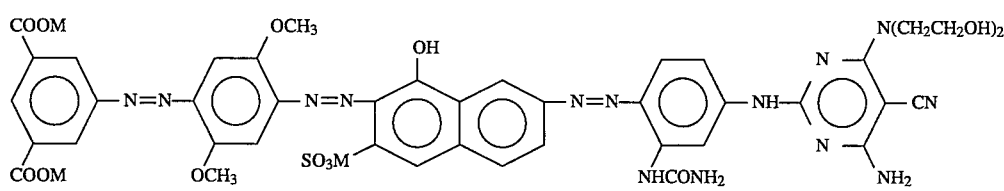

No. IV-2

-continued

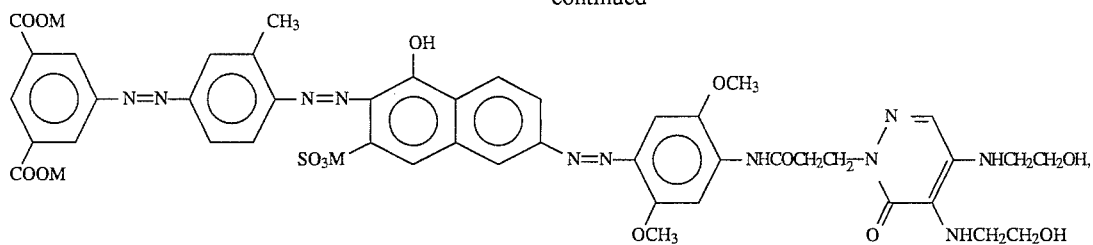
No. IV-3

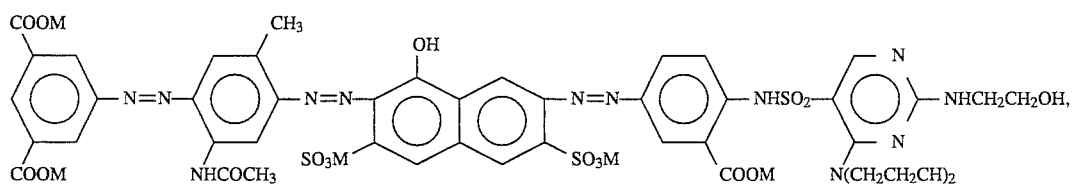
No. IV-4

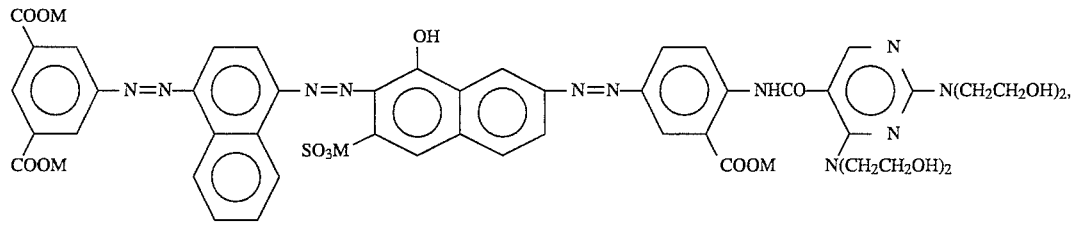
No. IV-5

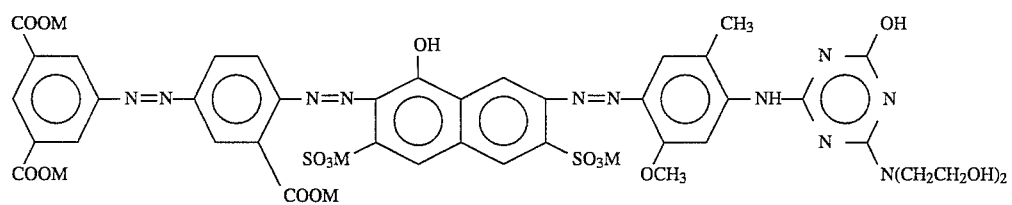
No. IV-6 and

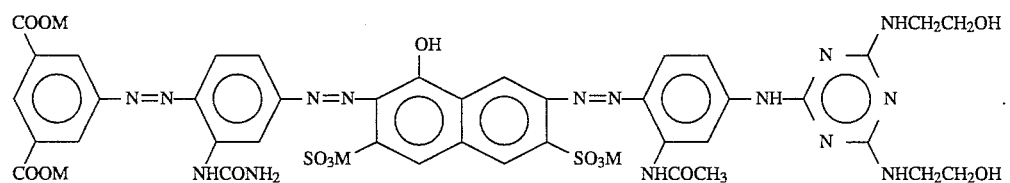
No. IV-7

In the above structural formulae, M is Na, K or ammonium. Although all of them are preferred, the ammonium ion is particularly effective from the viewpoint of the improvement of water fastness because the ammonium ion bonded to a carboxyl group gradually vaporizes in the form of ammonia after printing, so that the dye remains in the form of a free acid which is hardly soluble or insoluble in water.

The dye compound preferably has 1 or 2 sulfonic groups per molecule from the viewpoint of the stability to dissolution of the dye. At this time, however, it is preferable from the viewpoint of exhibiting good water fastness that the number of the carboxyl groups be no fewer than that of the sulfonic groups. More preferably, the number of the carboxyl groups exceeds that of the sulfonic groups.

The dyes according to the fourth aspect of the present invention as described above may be synthesized in accordance with the process described in Yutaka Hosoda, "Riron Seizo: Senryo Kagaku (Theory and Preparation: Dyestuff Chemistry)" or the like. For example, the dye of Specific Example No. IV-1 is synthesized in the following manner. Aniline-3,5-dicarboxylic acid is diazotized with sodium nitrite in accordance with a method known per se in the art. The resulting diazotized compound is coupled with 1-naphthylamine-6-carboxylic acid at pH 4 to 6. The resulting reaction product is diazotized again to couple it with gamma acid at pH 8 to 10. The resultant disazo product is further diazotized to couple it with aniline at pH 4 to 6. The resulting product is then reacted with cyanuric chloride at 0° to 10° C. Finally, this reaction product is reacted with a twofold mol of monoethanolamine at 50° to 90° C., thereby obtaining the intended compound.

As described above, the number of carboxyl groups introduced in a molecule of the dye according to the fourth aspect of the present invention can be strictly controlled. In addition, it can be produced at a low cost because the existing intermediate is used.

No particular limitation is imposed on the amount of the dye to be used in each of the inks according to the present invention. However, it is preferable for the dye to amount to generally 0.1 to 15% by weight, preferably 0.5 to 10% by weight, more preferably 0.5 to 6% by weight of the total weight of the ink. The dyes of the present invention may be used either singly or in any combination thereof.

The medium suitable for use in the inks according to the present invention is water or a mixed solvent of water and a water-soluble organic solvent. As the water, it is preferable to use deionized water instead of tap water containing various ions.

As examples of the water-soluble organic solvent used in combination with water, may be mentioned alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol and diethylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; 1,3-dimethyl-2-imidazolidinone; and the like.

The above-mentioned organic solvents may be suitably chosen for use. In the case of the dyes of the present invention, it is however preferable to use diethylene glycol or thiodiglycol, in particular, for the purpose of preventing the ink according to the present invention from clogging. It is also preferable to use a nitrogen-containing cyclic compound or an ether compound of a polyalkylene oxide from the viewpoint of the improvement of optical density of image and ejection stability. Further, a lower alcohol or surfactant may preferably be used from the viewpoint of the improvement of frequency response. Therefore, preferred solvent compositions in the present invention are those containing a variety of the components as described above in addition to water. The content of the water-soluble organic solvent in the ink is generally within a range of from 2 to 80% by weight, preferably from 3 to 70% by weight, more preferably from 4 to 60% by weight of the total weight of the ink.

The proportion of water to be used is generally within a range of from 10 to 97.5% by weight, preferably at least 35% by weight, more preferably at least 45% by weight of the total weight of the ink. If the amount of water is too little, a great amount of the low-volatile organic solvent leaves in images formed, resulting in problems of migration of dye, bleeding of the images, etc. It is hence not preferred to use water in such a small amount.

The inks of the present invention may contain, in addition to the above components, a pH adjustor, viscosity modifier, surface tension modifier and/or the like as needed. As examples of the pH adjustor, may be mentioned various kinds of organic amines such as diethanolamine and triethanolamine; inorganic alkalis such as the hydroxides of alkali metals, for example, sodium hydroxide, lithium hydroxide, potassium hydroxide, etc.; and the like.

The inks of the present invention as described above preferably have a viscosity of 1 to 20 cP, preferably 1 to 15 cP at 25° C., a surface tension of at least 30 dyn/cm, preferably at least 40 dyn/cm, and a pH of about 6 to 10.

The inks of the present invention are effective for use in recording methods of an ink-jet recording system. As a recording material, may be used any of general-purpose plain paper (for example, woodfree paper, medium-quality paper and bond paper), coated paper, plastic films for OHP, etc.

The inks of the present invention are particularly suitable for use in an ink-jet recording system of a type that an ink is ejected by the bubbling phenomenon of the ink caused by thermal energy. This recording system has a feature that the ejection of the ink becomes extremely stable, and no satellite dots are generated. In this case, the thermal properties (for example, the specific heat, the coefficient of thermal expansion, the heat conductivity, etc.) of the ink may however be controlled in some cases.

The inks according to the present invention may suitably be used, in particular, in an ink-jet recording system of a type that droplets of ink are ejected by the action of thermal energy or the like, thereby conducting recording. It however goes without saying that the inks may also be used for general-purpose writing implements.

As preferred methods and apparatus for conducting recording by using the inks according to the present invention, may be mentioned a method and apparatus in which thermal energy corresponding to recording signals is applied to an ink within a recording head, and ink droplets are generated in accordance with the thermal energy.

Figure 2:
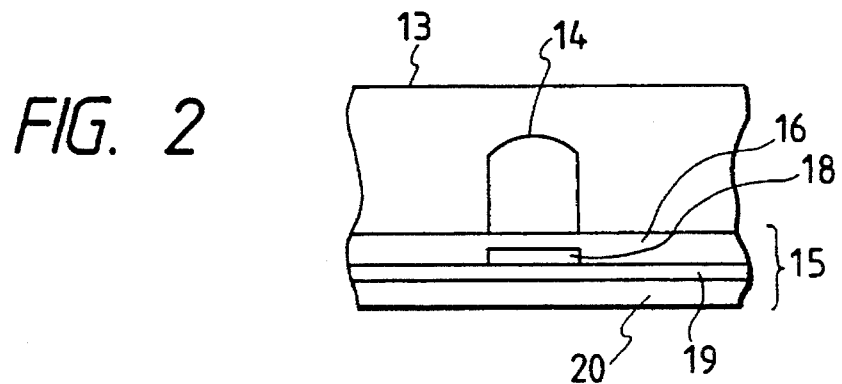
FIG. 2 is a transverse cross-sectional view of the head of the ink-jet recording apparatus.
Figure 3:
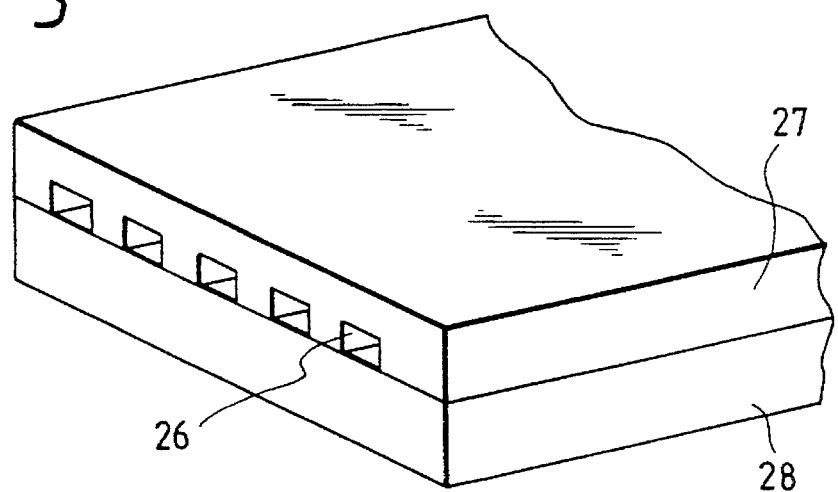
FIG. 3 is a perspective view of the appearance of a multi-head which is an array of such heads as shown in FIGS. 1 and 2.

Examples of the construction of a head, which is a main component of such an apparatus, are illustrated in FIGS. 1, 2 and 3.

A head 13 is formed by bonding a glass, ceramic or plastic plate or the like having a groove 14 through which an ink is passed, to a heating head 15, which is used for thermal recording (the drawing shows a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice 22 (a minute opening) and forms a meniscus 23 owing to a pressure (not shown).

Now, upon application of electric signals to the electrodes 17-1, 17-2, the heating head 15 rapidly generates heat at the region shown by n to form bubbles in the ink 21 which is in contact with the region. The meniscus 23 of the ink is projected by the action of the pressure thus produced, and the ink 21 is ejected from the orifice 22 to a recording material 25 in the form of recording droplets 24. FIG. 3 illustrates an appearance of a multi-head composed of an array of a number of heads as shown in FIG. 1. The multi-head is formed by bonding a glass plate 27 having a number of grooves 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
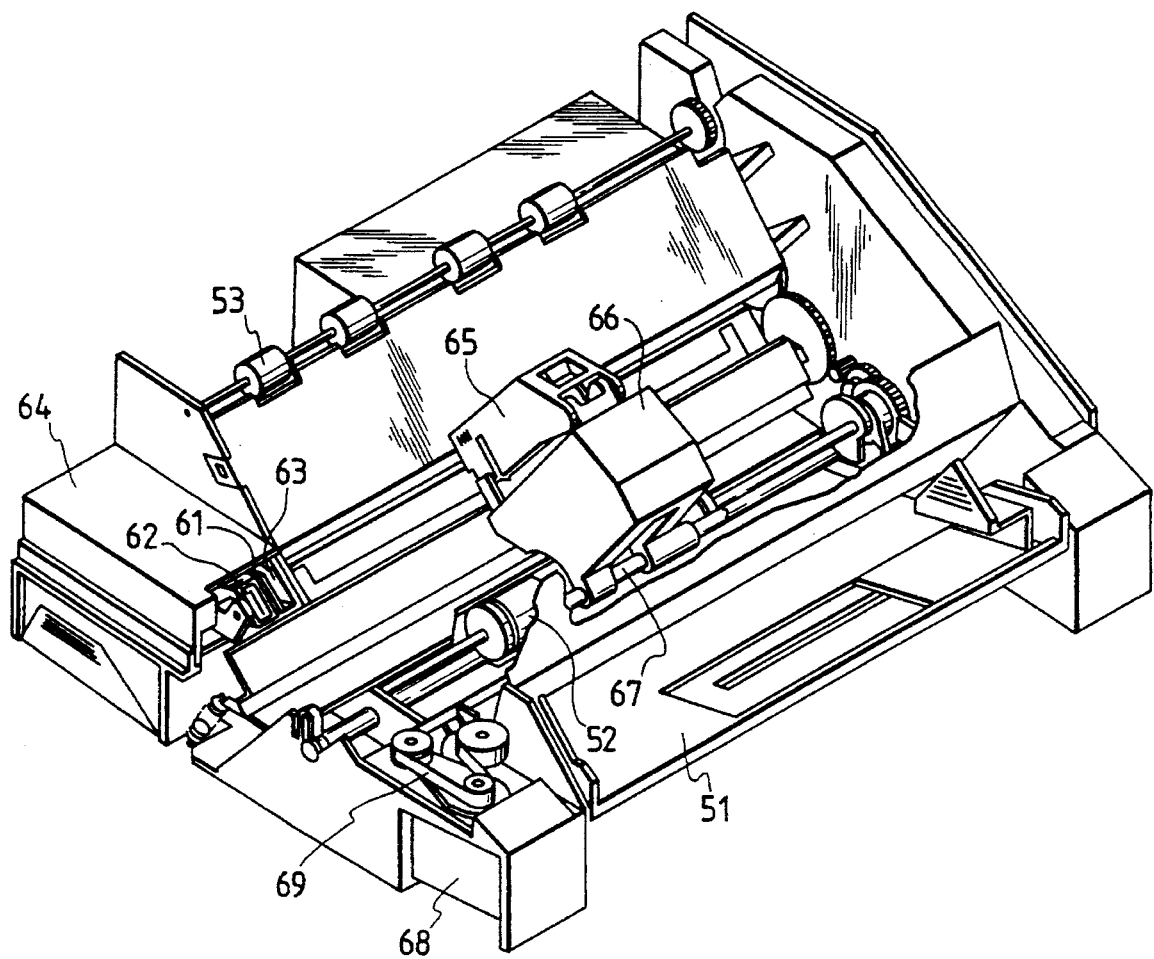
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at the position adjacent to the region in which a recording head operates, and in this embodiment, is held in such a form that it protrudes to the course through which the recording head is moved. Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade, held in such a form that it protrudes to the course through which the recording head is moved. The above-described blade 61, cap 62 and absorbing member 63 constitute an ejection-recovery portion 64, where the blade 61 and absorbing member 63 remove off water, dust and/or the like from the ink ejection opening face.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
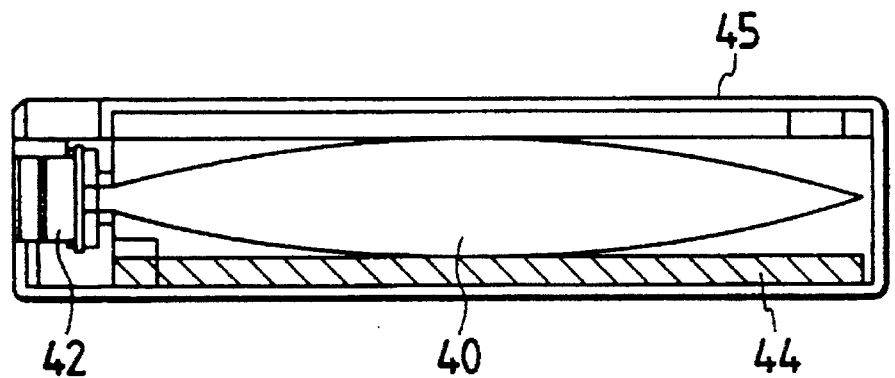
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink. It is preferred in the present invention that the ink container portion is formed of a polyolefin, in particular, polyethylene, at its surface with which the ink comes into contact.

The ink-jet recording apparatus used in the present invention may not be limited to the apparatus as described above in which the head and the ink cartridge are separately provided. Therefore, a device in which these members are integrally formed as shown in FIG. 6 can also be preferably used.

Figure 6:
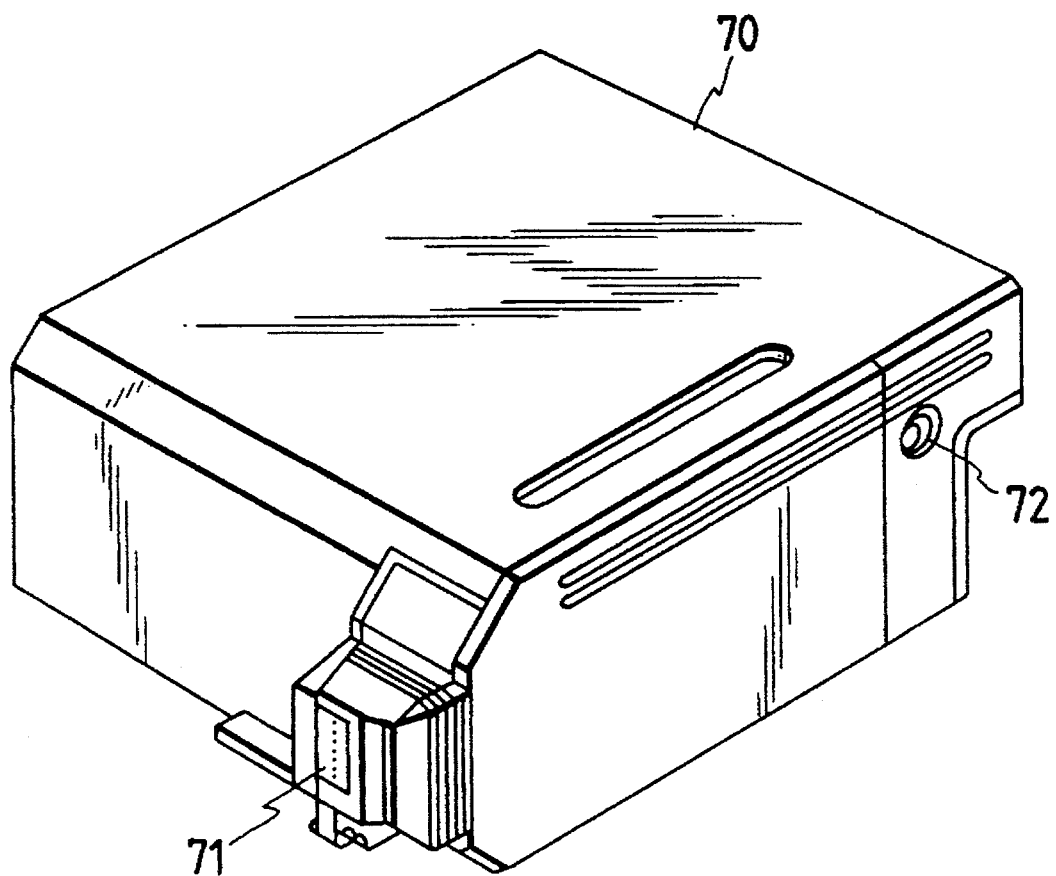
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane is preferably used as a material for the ink-absorbing member.

Reference numeral 72 indicates an air passage for communicating the interior of the recording unit 70 with the atmosphere.

The recording unit 70 can be used in place of the recording head shown in FIG. 4, and is detachably installed on the carriage 66.

The present invention will hereinafter be described more specifically by the following examples and comparative examples as to the first to fourth aspects of the present invention. Incidentally, all designations of "part" or "parts" as will be used in the following examples to mean part or parts by weight unless expressly noted.

[First aspect]

EXAMPLES 1 TO 8

Inks according to the first aspect of the present invention were prepared and evaluated as follows.
(1) Preparation of inks:

Inks according to the first aspect were prepared by separately using the above-exemplified compounds as to the first aspect, mixing their corresponding components shown in the following Table 1 into solutions and filtering the resulting solutions through a filter having a pore size of 0.2 µm. Incidentally, the inks were adjusted to pH 9.0 to 9.5 with hydrochloric acid or aqueous ammonia.

TABLE 1

| Example No. | Ink component | Amount used (parts) |
| --- | --- | --- |
| 1 | Diethylene glycol | 15 |
|   | 2-Pyrrolidone | 5 |
|   | Ethanol | 3 |
|   | Compound No. I-1 (M = Na) | 3 |
|   | Purified water | 74 |
| 2 | Thiodiglycol | 10 |
|   | N-Methyl-2-pyrrolidone | 7 |
|   | 2-Propanol | 3 |
|   | Compound No. I-2 (M = NH$_4$) | 3 |
|   | Purified water | 77 |
| 3 | Glycerol | 12 |
|   | 2-Pyrrolidone | 5 |
|   | 2-Propanol | 3 |
|   | Compound No. I-3 (M = NH$_4$) | 4 |
|   | Purified water | 76 |
| 4 | Polyethylene glycol 300 | 15 |
|   | Ethylene glycol | 5 |
|   | Ethanol | 4 |
|   | Compound No. I-4 (M = Na) | 3 |
|   | Purified water | 73 |
| 5 | Diethylene glycol | 5 |
|   | Thiodiglycol | 5 |
|   | Ethanol | 4 |
|   | Compound No. I-5 (M = K) | 3 |
|   | Purified water | 83 |
| 6 | Diethylene glycol | 10 |
|   | Diethylene glycol monomethyl ether | 5 |
|   | 1-Propanol | 3 |
|   | Compound No. I-6 (M = NH$_4$) | 4 |

TABLE 1-continued

| Example No. | Ink component | Amount used (parts) |
|---|---|---|
| | Purified water | 78 |
| 7 | Glycerol | 10 |
| | 2-Pyrrolidone | 5 |
| | 3-Propanol | 3 |
| | Compound No. I-7 (M = NH$_4$) | 3 |
| | Purified water | 79 |
| 8 | Ethylene glycol | 10 |
| | N-Methyl-2-pyrrolidone | 5 |
| | 2-Propanol | 3 |
| | Compound No. I-8 (M = NH$_4$) | 4 |
| | Purified water | 78 |

(2) Application example of inks:

The inks prepared above were separately charged in a recording apparatus equipped with an On-Demand type multihead (orifice diameter: 40×40 μm, drive voltage: 32 V, frequency: 3.5 kHz) which made a record by applying thermal energy to the ink in a recording head to generate droplets of the ink, thereby conducting printing to evaluate them in the following points. The evaluation results are given in Table 2 which will be shown subsequently.

(a) Optical density:

Printing was conducted on two kinds of plain paper for copying (Canon NP Paper and Xerox 4024 Paper) with all of the nozzles simultaneously driven to prepare respective solid print patches. The optical densities thereof were measured to rank the optical density in terms of the average value in accordance with the following standard:

A: Optical density not lower than 1.25

B: Optical density of 1.20 to 1.24

C: Optical density of 1.00 to 1.19

D: Optical density of 0.99 or lower.

(b) Percent occurrence of feathering:

Dots were continuously printed on the same kinds of paper as those used above so as not to overlap one another. The number of dots on which undefined or irregular feathering occurred was counted through a microscope to calculate percent occurrence of feathering in terms of the average value, thereby ranking the resistance to feathering in accordance with the following standard:

A: Not higher than 5%

B: 6 to 10%

C: 11 to 20%

D: Not lower than 21%.

(c) Fixing ability:

Upon predetermined periods of time elapsed after printing English characters and numerals (60 letters×40 on A4-sized paper on the same kinds of paper as those used above, the printed portions were rubbed with a lens-cleaning paper to determine the average time (seconds) required until printed characters became free from blurring, thereby ranking the fixing ability in accordance with the following standard:

A: Not longer than 10 seconds

B: 11 to 15 seconds

C: 16 to 30 seconds

D: Not shorter than 31 seconds.

(d) Light fastness:

The degree of discoloration after exposing the solid print patches prepared in the item (a) to indoor light for 2 months was determined as the percent reduction (average value) in optical density to rank the light fastness in accordance with the following standard:

A: Less than 10%

B: 10 to 20%

C: Not less than 20.1%.

(e) Water fastness:

(e-1) The solid print patches prepared in the item (a) were gently immersed for 1 hour in tap water at 20° C. and then dried, thereby determining the percent reduction (average value) in optical density to rank the water fastness in accordance with the following standard:

A: Less than 10%

B: 10 to 20%

C: 20.1 to 40%

D: Not less than 40.1%.

(e-2) The print samples prepared in the item (c) were immersed for 3 seconds in tap water at 20° C. and then taken out at once to dry them, thereby determining the degree of staining on white portions due to running of the dye to rank the water fastness in accordance with the following standard:

A: Staining was scarcely recognized

B: Staining was slightly recognized

C: Staining was rather considerably recognized

D: Staining was very considerably recognized.

(e-3) The characters on the print samples prepared in the item (c) were rubbed once in the direction of line with a commercially-available yellow fluorescent felt pen, thereby determining the degree of blurred characters to rank the water fastness in accordance with the following standard:

A: Blurring was scarcely recognized

B: Blurring was slightly recognized

C: Blurring was considerably recognized.

(f) Ejection stability:

English characters and numerals (60 letters×40 lines) were printed on 400 sheets of A4-sized paper to rank the ejection stability in accordance with the following standard:

A: Normal in ejection or printing

B: Partial ejection failure or irregular printing occurred.

(g) Clogging tendency:

After the printer was left over for 2 months at room temperature with cap on nozzles, recovery operation (sucking operation by pumping) was conducted to determine the number of recovery operations required until printing was resumed, thereby ranking the clogging tendency in accordance with the following standard:

A: Normal printing was resumed by one or less recovery operation

B: Normal printing was resumed by two to four recovery operations

C: Normal printing was resumed by five to ten recovery operations.

TABLE 2

| Evaluation item | Example No. | | | | | | | |
|---|---|---|---|---|---|---|---|---|
| | 1 | 2 | 3 | 4 | 5 | 6 | 7 | 8 |
| (a) | A | B | B | A | A | B | A | B |
| (b) | A | A | A | A | A | A | A | A |
| (c) | A | A | A | A | A | A | A | A |
| (d) | A | A | A | A | A | A | A | A |
| (e-1) | A | A | A | A | A | B | A | A |
| (e-2) | B | A | A | A | A | C | B | A |
| (e-3) | B | A | A | A | A | B | A | A |
| (f) | A | A | A | A | A | A | A | A |

TABLE 2-continued

| Evaluation item | Example No. | | | | | | | |
|---|---|---|---|---|---|---|---|---|
| | 1 | 2 | 3 | 4 | 5 | 6 | 7 | 8 |
| (g) | A | B | A | A | A | A | A | B |

Comparative Examples 1 to 5

Similarly to Examples 1 to 8, inks having the following composition were prepared using their corresponding dyes shown in the following Table 3, and evaluated in the same manner as described above. The results are given in Table 4.

| Ink composition: | |
|---|---|
| Diethylene glycol | 15 parts |
| 2-Pyrrolidone | 5 parts |
| Ethanol | 3 parts |
| Dye (M = Na) | 3 parts |
| Purified water | 74 parts. |

TABLE 3

C-1

[Chemical structure: dimethylphenyl-N=N-naphthol with SO$_3$M groups, NH-triazine with two NH$_2$ groups]

C-2

[Chemical structure: naphthyl-N=N-naphthol with SO$_3$M, NHCOCH$_2$CH$_2$-N linked to pyridazinone with two NH$_2$ groups]

C-3

[Chemical structure: phenyl-N=N-naphthol with OH, NHCOCH$_3$, and two SO$_3$M groups]

C-4

[Chemical structure: naphthyl(SO$_3$M)-N=N-naphthol(SO$_3$M, OH)-NH-triazine with NH-C$_6$H$_4$-COOM and NHCH$_2$CH$_2$OH substituents, SO$_3$M]

C-5

[Chemical structure: naphthyl(SO$_3$M, SO$_3$M)-N=N-naphthol(SO$_3$M, OH)-NH-triazine with O-C$_6$H$_4$-SO$_3$M and NHCH$_2$CHCH$_3$(OH) substituents, SO$_3$M]

TABLE 4

| Evaluation item | Comparative Example No. | | | | |
|---|---|---|---|---|---|
| | 1 | 2 | 3 | 4 | 5 |
| (a) | A | D | A | B | B |
| (b) | D | C | D | D | D |
| (c) | D | C | D | C | D |
| (d) | A | A | A | A | A |
| (e-1) | D | B | D | D | D |
| (e-2) | C | B | C | D | D |
| (e-3) | C | C | C | C | C |
| (f) | A | B | A | A | A |
| (g) | A | C | A | A | A |

In the case of Comparative Example 2, the dye was not fully dissolved in the solvent component for the ink due to its low solubility.

[Second aspect]

EXAMPLES 9 TO 16

Inks according to the second aspect of the present invention were prepared and evaluated as follows.

(1) Preparation of inks:

Inks according to the second aspect were prepared by separately using the above-exemplified compounds as to the second aspect, mixing their corresponding components shown in the following Table 5 into solutions, adjusting the solutions to pH 9 to 9.5 with hydrochloric acid or aqueous ammonia and filtering the resulting solutions through a filter having a pore size of 0.2 μm.

TABLE 5

| Example No. | Ink component | Amount used (parts) |
|---|---|---|
| 9 | Glycerol | 10 |
| | 2-Pyrrolidone | 5 |
| | 1-Propanol | 3 |
| | Compound No. II-1 (M = Na) | 3 |
| | Purified water | 79 |
| 10 | Diethylene glycol | 10 |
| | N-Methyl-2-pyrrolidone | 7 |
| | 2-Propanol | 3 |
| | Compound No. II-2 (M = K) | 3 |
| | Purified water | 77 |
| 11 | Diethylene glycol | 10 |
| | Ethylene glycol monomethyl ether | 5 |
| | Ethanol | 3 |
| | Compound No. II-3 (M = NH$_4$) | 4 |
| | Purified water | 78 |
| 12 | Diethylene glycol | 15 |
| | N-Methyl-2-pyrrolidone | 5 |
| | Ethanol | 3 |
| | Compound No. II-4 (M = Na) | 3 |
| | Purified water | 74 |
| 13 | Diethylene glycol | 5 |
| | Thiodiglycol | 5 |
| | Ethanol | 4 |
| | Compound No. II-5 (M = K) | 3 |
| | Purified water | 83 |
| 14 | Thiodiglycol | 10 |
| | N-Methyl-2-pyrrolidone | 7 |
| | 2-Propanol | 3 |
| | Compound No. II-6 (M = NH$_4$) | 3 |
| | Purified water | 77 |
| 15 | Polyethylene glycol 300 | 15 |
| | 2-Pyrrolidone | 5 |
| | Ethanol | 4 |
| | Compound No. II-7 (M = NH$_4$) | 3 |
| | Purified water | 73 |
| 16 | Glycerol | 12 |

TABLE 5-continued

| Example No. | Ink component | Amount used (parts) |
|---|---|---|
| | 2-Propanol | 5 |
| | Ethanol | 3 |
| | Compound No. II-8 (M = NH$_4$) | 4 |
| | Purified water | 76 |

(2) Application example of inks:

The inks prepared above were separately charged in the same recording apparatus as that used in the first aspect to conduct printing, thereby evaluating them as follows. The evaluation results are given in Table 6 which will be shown subsequently.

The evaluation as to (a) optical density, (b) percent occurrence of feathering, (c) fixing ability, (d) light fastness, (e) water fastness [(e-1) to (e-3)], (f) ejection stability and (g) clogging tendency was performed in the same manner as in the first aspect. The inks were further evaluated in the following item.

(h) Stability to intermittent ejection:

When an intermittent operation of (1) 10-second continuous ejection→(2) suspension of ejection for a predetermined period of time→(3) continuous ejection is conducted, whether the disorder of ejection direction occurs or not at the beginning of the continuous ejection of (3) is determined by the suspension time of (2). Therefore, this suspension time was changed by stages, thereby determining the stability to intermittent ejection to rank it in accordance with the following standard. Incidentally, this operation was conducted under environmental conditions of 20° C. and 45% RH.

A: Stably ejected even after suspended for 45 seconds or longer

B: Stably ejected after suspended for from 44 down to 30 seconds

C: Stably ejected after suspended for from 29 down to 15 seconds

D: Stably ejected only after suspended for 14 seconds or shorter.

TABLE 6

| Evaluation item | Example No. | | | | | | | |
|---|---|---|---|---|---|---|---|---|
| | 9 | 10 | 11 | 12 | 13 | 14 | 15 | 16 |
| (a) | A | A | A | A | A | A | A | A |
| (b) | A | A | A | A | A | A | A | A |
| (c) | A | A | A | A | A | A | A | A |
| (d) | A | A | A | A | A | A | A | A |
| (e-1) | A | A | A | A | A | A | A | A |
| (e-2) | B | A | A | A | B | A | A | A |
| (e-3) | A | A | A | A | A | A | A | A |
| (f) | A | A | A | A | A | A | A | A |
| (g) | A | A | B | A | A | A | B | B |
| (h) | A | A | A | A | A | A | A | A |

Comparative Examples 6 to 13

Similarly to Examples 9 to 16, inks having the same composition as that of the ink in Example 9 were prepared using their corresponding dyes shown in the following Table 7, and evaluated in the same manner as described above. The results are shown in Table 8.

TABLE 7

TABLE 7-continued

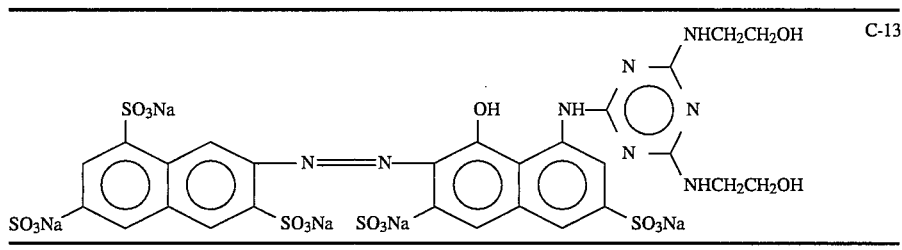

[Third aspect]

EXAMPLES 17 TO 23

Inks according to the third aspect of the present invention were prepared and evaluated as follows.

(1) Preparation of inks:

Inks according to the third aspect were prepared by separately using the above-exemplified compounds as to the third aspect, mixing their corresponding components shown in the following Table 9 into solutions and filtering the resulting solutions through a filter having a pore size of 0.2 μm. Incidentally, the inks were adjusted to pH 9 to 9.5 with hydrochloric acid or aqueous ammonia.

TABLE 9

| Example No. | Ink component | Amount used (parts) |
|---|---|---|
| 17 | Polyethylene glycol 300 | 15 |
| | Diethylene glycol | 5 |
| | Ethanol | 4 |
| | Compound No. III-1 (M = NH$_4$) | 3 |
| | Purified water | 73 |
| 18 | Diethylene glycol | 5 |
| | Thiodiglycol | 5 |
| | 2-Propanol | 4 |
| | Compound No. III-2 (M = K) | 3 |
| | Purified water | 83 |
| 19 | Diethylene glycol | 15 |
| | N-Methyl-2-pyrrolidone | 5 |
| | Ethanol | 3 |
| | Compound No. III-3 (M = Na) | 3 |
| | Purified water | 74 |
| 20 | Thiodiglycol | 10 |
| | 2-Pyrrolidone | 7 |
| | Ethanol | 3 |
| | Compound No. III-4 (M = NH$_4$) | 3 |
| | Purified water | 77 |
| 21 | Diethylene glycol | 10 |
| | 2-Pyrrolidone | 5 |
| | 2-Propanol | 3 |
| | Compound No. III-5 (M = Na) | 3 |
| | Purified water | 79 |
| 22 | Diethylene glycol | 10 |
| | N-Methyl-2-pyrrolidone | 5 |
| | 2-Propanol | 3 |
| | Compound No. III-6 (M = NH$_4$) | 4 |
| | Purified water | 78 |
| 23 | Glycerol | 12 |
| | N-Methyl-2-pyrrolidone | 5 |
| | 1-Propanol | 3 |
| | Compound No. III-7 (M = NH$_4$) | 4 |
| | Purified water | 76 |

(2) Application example of inks:

The inks prepared above were separately charged in the same recording apparatus as that used in the first aspect to conduct printing, thereby evaluating them as follows. The evaluation results are given in Table 10 which will be shown subsequently.

The evaluation as to (a) optical density, (b) percent occurrence of feathering, (c) fixing ability, (d) light fastness, (f) ejection stability, (g) clogging tendency and (h) stability to intermittent ejection was performed in the same manner as in the second aspect, and the evaluation as to (e) water fastness was conducted in accordance with the following methods:

(e) Water fastness:

(e-1) The solid print patches prepared in the item (a) were gently immersed for 1 hour in tap water at 20° C. and then dried, thereby determining the percent reduction (average value) in optical density to rank the water fastness in accordance with the following standard:

A: Less than 10%

B: 10 to 15%

C: 15.1 to 30%

D: Not less than 30.1%.

(e-2) The print samples prepared in the item (c) were immersed for 3 seconds in tap water at 20° C. and then taken out at once to dry them, thereby determining the degree of staining on white portions due to running of the dye to rank the water fastness in accordance with the following standard:

A: Staining was scarcely recognized

B: Staining was slightly recognized

C: Staining was rather considerably recognized

D: Staining was very considerably recognized.

(e-3) The characters on the print samples prepared in the item (c) were rubbed once in the direction of line with a commercially-available yellow fluorescent felt pen, thereby determining the degree of blurred characters to rank the water fastness in accordance with the following standard:

A: Blurring was scarcely recognized

B: Blurring was slightly recognized

C: Blurring was considerably recognized.

TABLE 10

| Evaluation item | Example No. | | | | | | |
|---|---|---|---|---|---|---|---|
| | 17 | 18 | 19 | 20 | 21 | 22 | 23 |
| (a) | A | A | A | A | A | A | A |
| (b) | A | A | A | A | A | A | A |
| (c) | A | A | A | A | A | A | A |
| (d) | A | A | A | A | A | A | A |
| (e-1) | A | A | B | A | B | A | A |
| (e-2) | A | B | B | A | B | A | A |
| (e-3) | A | A | A | A | A | A | A |
| (f) | A | A | A | A | A | A | A |
| (g) | B | A | B | A | B | A | B |
| (h) | A | A | A | A | A | A | A |

Comparative Examples 14 to 20

Similarly to Examples 17 to 23, inks having the same composition as that of the ink in Example 17 were prepared using their corresponding dyes shown in the following Table 11, and evaluated in the same manner as described above.
The results are shown in Table 12.
TABLE 11
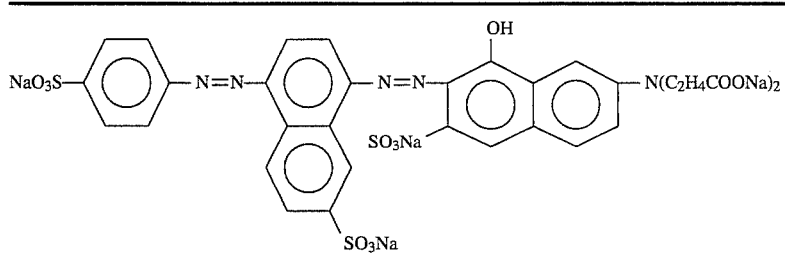
C-14
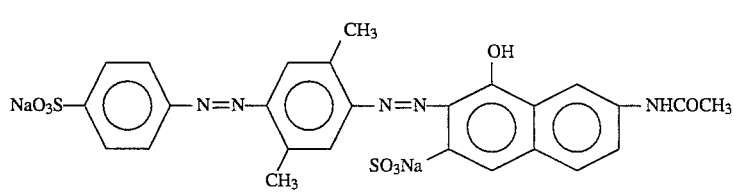
C-15
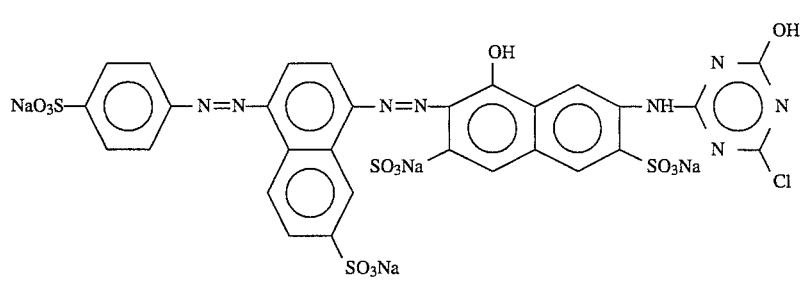
C-16
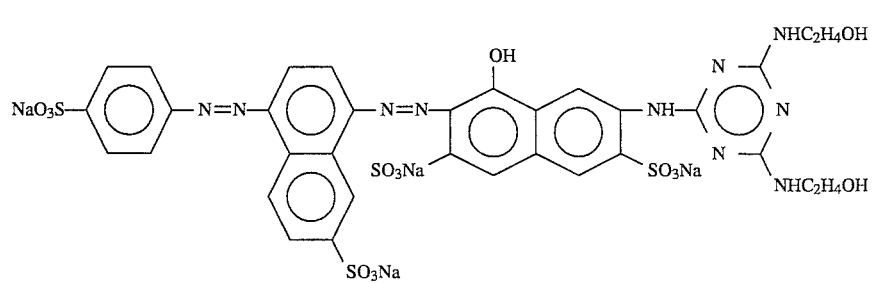
C-17
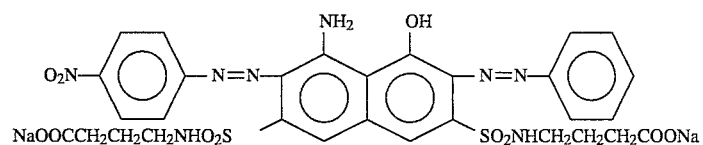
C-18
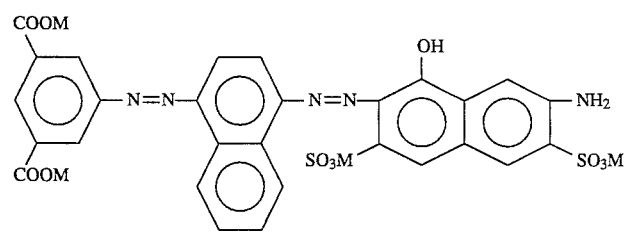
C-19
$M = N(C_2H_5)_2(C_2H_4OH)_2$ TABLE 11-continued

C-20

[Chemical structure: A compound with two COONH₄ groups on a benzene ring connected via N=N to a naphthalene group with SO₃NH₄, further connected via N=N to a naphthol group with OH and NH₂ substituents]

TABLE 12

| Evaluation item | Comparative Example No. | | | | | | |
|---|---|---|---|---|---|---|---|
| | 14 | 15 | 16 | 17 | 18 | 19 | 20 |
| (a) | A | A | A | A | D | A | A |
| (b) | B | C | D | D | A | A | A |
| (c) | C | C | C | D | B | A | A |
| (d) | A | A | A | A | A | A | A |
| (e-1) | D | C | D | D | A | B | A |
| (e-2) | C | C | D | D | A | B | A |
| (e-3) | C | C | C | C | A | A | A |
| (f) | A | A | A | A | A | A | A |
| (g) | B | A | A | A | D | C | D |
| (h) | C | B | A | A | D | D | D |

In the case of Comparative Example 18, the dye was not fully dissolved in the solvent component for the ink due to its low solubility.

[Fourth aspect]

EXAMPLES 24 TO 30

Inks according to the fourth aspect of the present invention were prepared and evaluated as follows.
(1) Preparation of inks:

Inks according to the fourth aspect were prepared by separately using the above-exemplified compounds as to the fourth aspect, mixing their corresponding components shown in the following Table 13 into solutions, adjusting the solutions to pH 9 to 9.5 with hydrochloric acid or aqueous ammonia and filtering the resulting solutions through a filter having a pore size of 0.2 μm.

TABLE 13

| Example No. | Ink component | Amount used (parts) |
|---|---|---|
| 24 | Thiodiglycol | 10 |
| | 2-Pyrrolidone | 7 |
| | Ethanol | 3 |
| | Compound No. IV-1 (M = NH₄) | 3 |
| | Purified water | 77 |
| 25 | Diethylene glycol | 15 |
| | N-Methyl-2-pyrrolidone | 5 |
| | 2-Propanol | 3 |
| | Compound No. IV-2 (M = Na) | 3 |
| | Purified water | 74 |
| 26 | Polyethylene glycol 300 | 15 |
| | Ethylene glycol | 5 |
| | Ethanol | 4 |
| | Compound No. IV-3 (M = NH₄) | 3 |
| | Purified water | 73 |
| 27 | Diethylene glycol | 10 |
| | 2-Pyrrolidone | 5 |
| | 2-Propanol | 3 |
| | Compound No. IV-4 (M = NH₄) | 3 |

TABLE 13-continued

| Example No. | Ink component | Amount used (parts) |
|---|---|---|
| | Purified water | 79 |
| 28 | Diethylene glycol | 5 |
| | Thiodiglycol | 5 |
| | 1-Propanol | 4 |
| | Compound No. IV-5 (M = K) | 3 |
| | Purified water | 83 |
| 29 | Diethylene glycol | 10 |
| | N-Methyl-2-pyrrolidone | 5 |
| | Ethanol | 3 |
| | Compound No. IV-6 (M = Na) | 4 |
| | Purified water | 78 |
| 30 | Glycerol | 12 |
| | 2-Pyrrolidone | 5 |
| | 1-Propanol | 3 |
| | Compound No. IV-7 (M = NH₄) | 4 |
| | Purified water | 76 |

(2) Application example of inks:

The inks prepared above were separately charged in the same recording apparatus as that used in the first aspect to conduct printing, thereby evaluating them as follows. The evaluation results are given in Table 14 which will be shown subsequently.

The evaluation as to (a) optical density of print, (b) percent occurrence of feathering, (c) fixing ability, (d) light fastness, (e) water fastness [(e-1) to (e-3)], (f) ejection stability, (g) clogging tendency and (h) stability to intermittent ejection was performed in the same manner as in the third aspect.

TABLE 14

| Evaluation item | Example No. | | | | | | |
|---|---|---|---|---|---|---|---|
| | 24 | 25 | 26 | 27 | 28 | 29 | 30 |
| (a) | A | A | A | A | A | A | A |
| (b) | A | A | A | A | A | A | A |
| (c) | A | A | A | A | A | A | A |
| (d) | A | A | A | A | A | A | A |
| (e-1) | B | A | A | A | A | A | B |
| (e-2) | B | A | A | A | A | A | B |
| (e-3) | B | A | A | A | A | A | B |
| (f) | A | A | A | A | A | A | A |
| (g) | A | A | B | A | B | A | A |
| (h) | A | A | A | A | A | A | A |

Comparative Examples 21 to 28

Similarly to Examples 24 to 30, inks having the same composition as that of the ink in Example 24 were prepared using their corresponding dyes shown in the following Table 15, and evaluated in the same manner as described above. The results are shown in Table 16.

TABLE 15
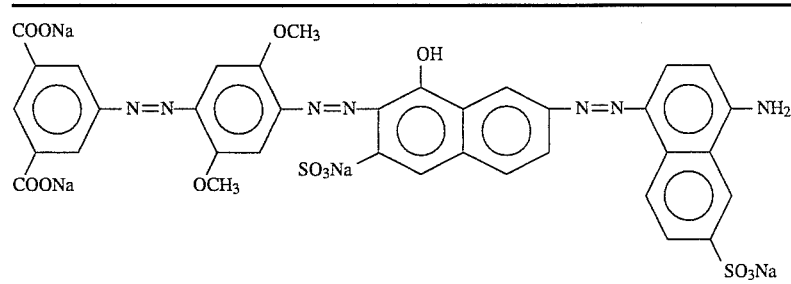
C-21
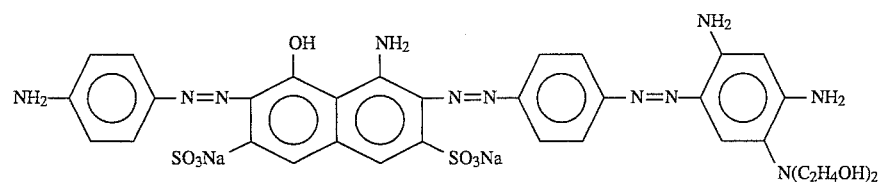
C-22
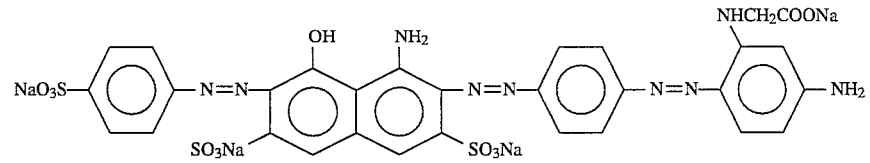
C-23
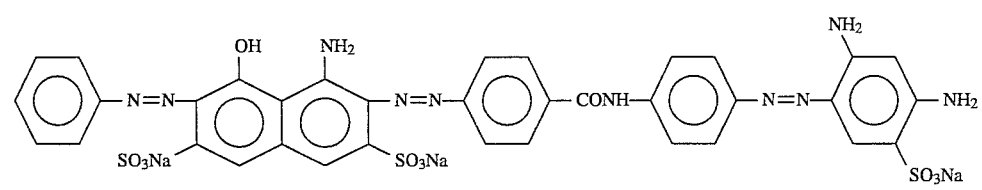
C-24
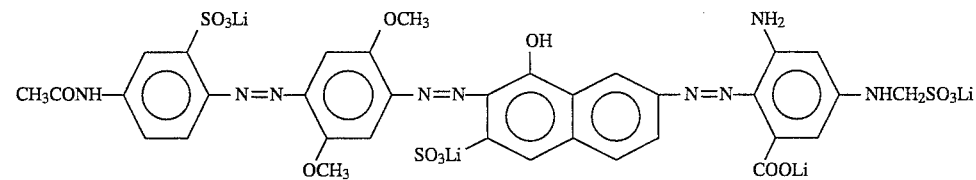
C-25
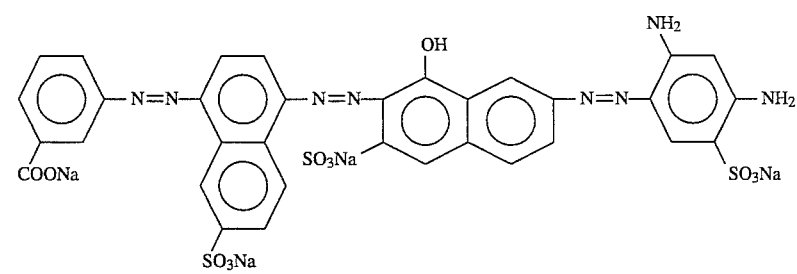
C-26
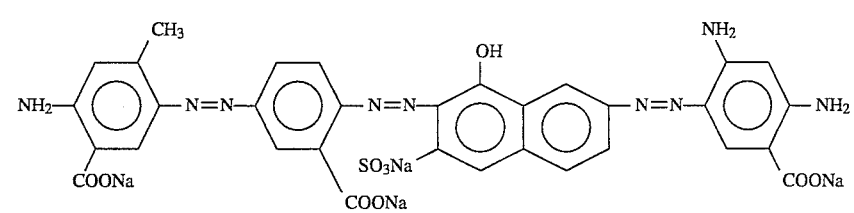
C-27

TABLE 15-continued

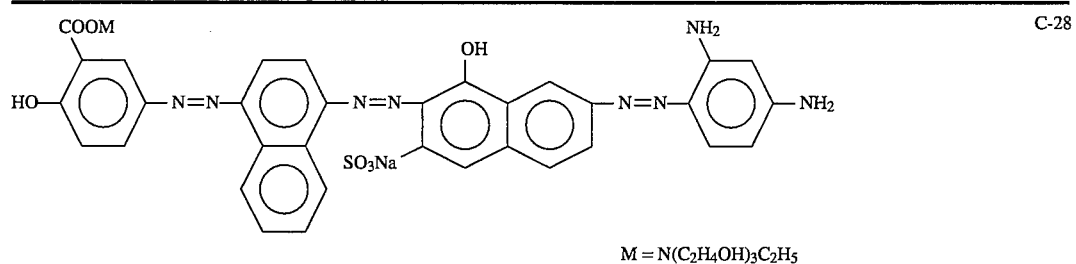

M = N(C₂H₄OH)₃C₂H₅

TABLE 16

| Evaluation item | Comparative Example No. | | | | | | | |
|---|---|---|---|---|---|---|---|---|
| | 21 | 22 | 23 | 24 | 25 | 26 | 27 | 28 |
| (a) | A | A | A | A | A | A | A | A |
| (b) | A | B | B | C | D | D | A | B |
| (c) | B | C | D | D | D | C | A | B |
| (d) | A | A | A | A | A | A | A | A |
| (e-1) | A | B | C | D | C | C | A | B |
| (e-2) | B | D | D | D | D | D | A | B |
| (e-3) | B | C | C | C | C | C | A | B |
| (f) | A | A | A | A | A | A | A | A |
| (g) | B | B | B | A | A | A | C | C |
| (h) | D | A | A | A | A | A | D | D |

According to the present invention, as has been described above, there can be provided novel azo compounds suitable for use in the preparation of inks which can provide images high in optical density, bright, free from undefined or irregular feathering and excellent in quality and water fastness on various types of plain paper, and are good in fixing ability, free from clogging and excellent in storage stability, heat stability and safety, inks separately containing such compounds, and an ink-jet recording method and an instrument using such an ink.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims are to be accorded the broadest interpretation so as to encompass all such modifications and equivalent structures and functions.

What is claimed is:

1. A monoazo dye compound having a structural unit represented by the following formula in its molecule:

—X—Y—(R₁)(R₂)(R₃)ₖ     [I]

wherein Y is a 6-membered ring containing 2 to 3 nitrogen atoms, X is a linking group for bonding a main body of the dye molecule to Y, $R_1$ is the first amino acid residue, $R_2$ is an atomic group selected from the following group A, $R_3$ is another atomic group selected from the following group BB, and k is a number of 0 or 1:

Group A: H, OH, $NH_2$, CN, =O and the second amino acid residue;

Group BB: H, OH, $NH_2$, CN and =O, the first and second amino acid residues being identical with or different from each other, and which is selected from the group consisting of the following compounds I-1 to I-11:

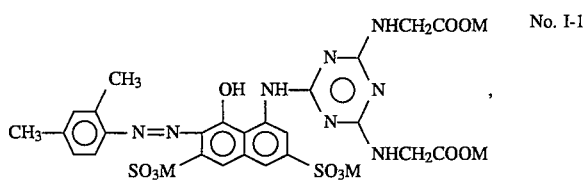

No. I-1

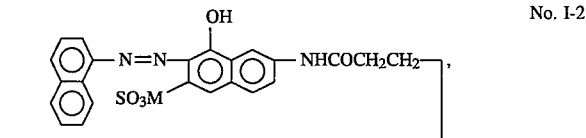

No. I-2

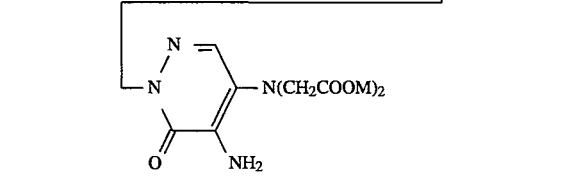

No. I-3

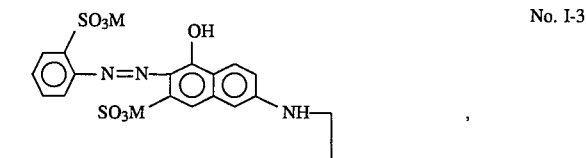

No. I-4

-continued

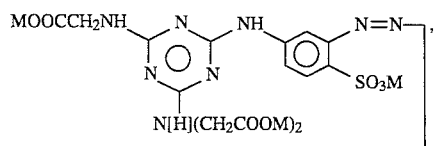
No. I-5

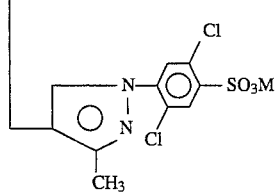

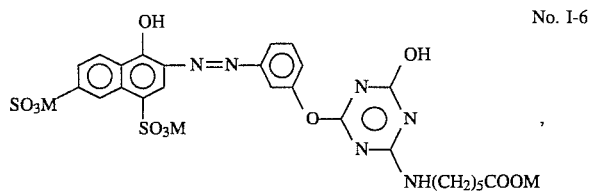
No. I-6

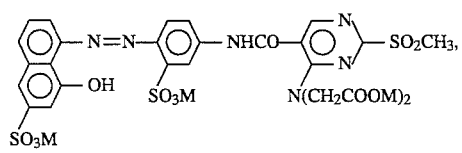
No. I-7

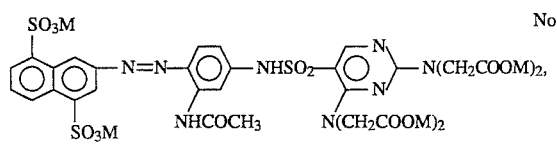
No. I-8

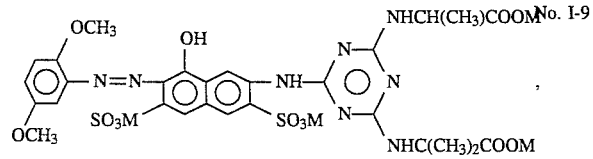
No. I-9

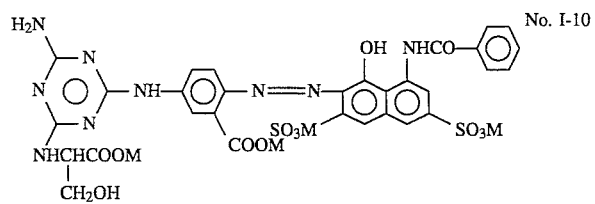
No. I-10 and

-continued

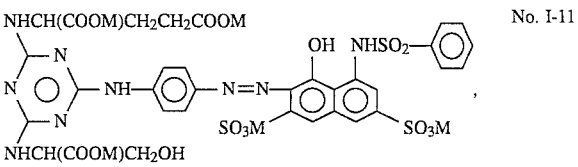
No. I-11 in which M is Na, K or ammonium.

2. An ink comprising a recording agent and a liquid medium for dissolving or dispersing the recording agent therein, wherein the recording agent comprises a monoazo dye compound having a structural unit represented by the following formula in its molecule:

$$-X-Y-(R_1)(R_2)(R_3)_k \qquad [I]$$

wherein Y is a 6-membered ring containing 2 or 3 nitrogen atoms, X is a linking group for bonding a main body of the dye molecule to Y, $R_1$ is the first amino acid residue, $R_2$ is an atomic group selected from the following group A, $R_3$ is another atomic group selected from the following group BB, and k is a number of 0 or 1:

Group A: H, OH, $NH_2$, CN, =O and the second amino acid residue;

Group BB: H, OH, $NH_2$, CN and =O, the first and second amino acid residues being identical with or different from each other.

3. The ink according to claim 2, wherein X is selected from the following group CC:

Group CC: —NH—, —NHCO—, —NHCOCH$_2$CH$_2$—, —NHSO$_2$— and —O—.

4. The ink according to claim 2, wherein Y is selected from the following group D:

Group D:

5. The ink according to claim 2, wherein the monoazo dye compound has 1 to 4 carboxyl groups and 1 or 2 sulfonic groups in its molecule.

6. The ink according to claim 2, wherein the recording agent comprises at least one compound selected from the group consisting of the following compounds I-1 to I-11:

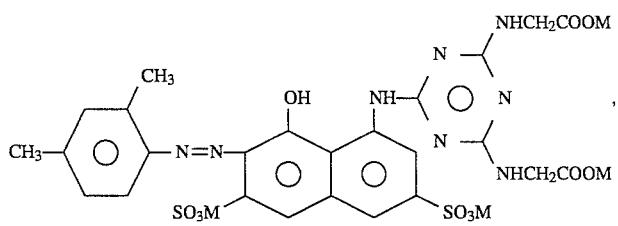
No. I-1

-continued
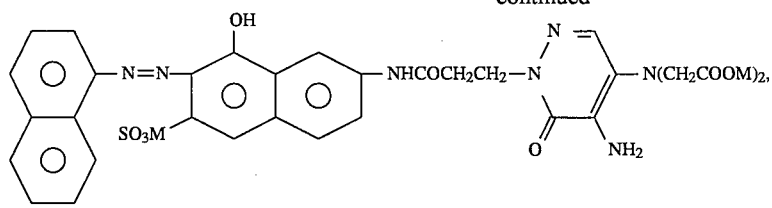
No. I-2
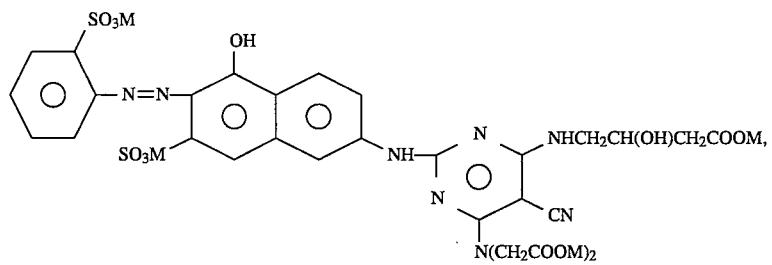
No. I-3
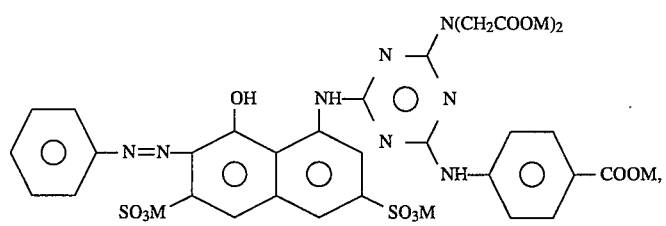
No. I-4
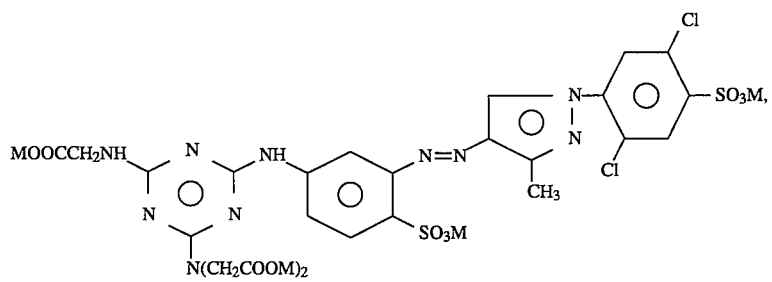
No. I-5
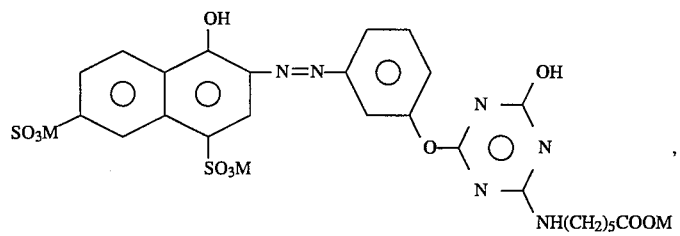
No. I-6
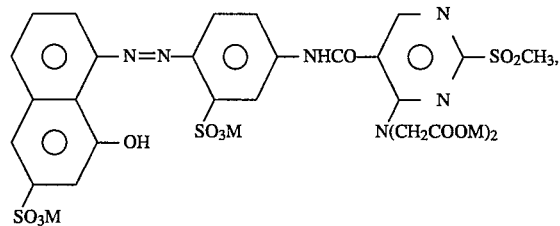
No. I-7
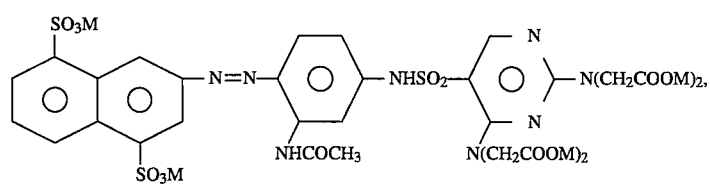
No. I-8

-continued

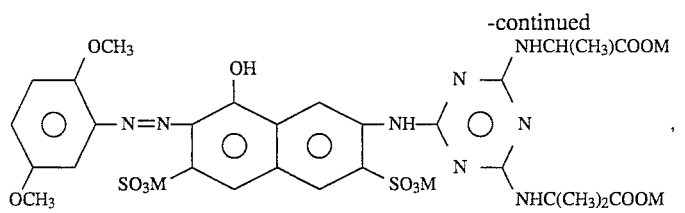
No. I-9

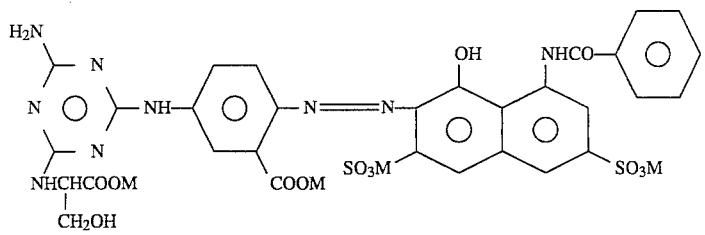
No. I-10 and

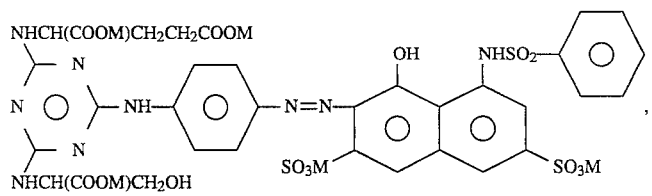
No. I-11 in which M is Na, K or ammonium.

7. A monoazo dye compound having a structural unit represented by the following formula in its molecule:

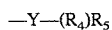   [II]

wherein Y is a 6-membered ring containing 2 or 3 nitrogen atoms, $R_4$ is $-N(H)_m(CH_2CH_2OH)_{2-m}$, in which m is a number of 0 or 1, and $R_5$ is an amino acid residue containing a —COOM group, in which M is an alkali metal or an ammonium.

8. The compound according to claim 7, wherein Y is selected from the following group E:

Group E:

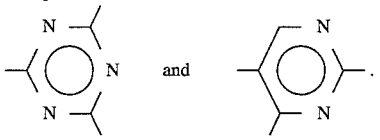

9. The compound according to claim 7, wherein the compound has 2 to 4 carboxyl groups and 1 or 2 sulfonic groups in its molecule.

10. The compound according to claim 7, which is selected from the group consisting of the following compounds II-1 to II-11:

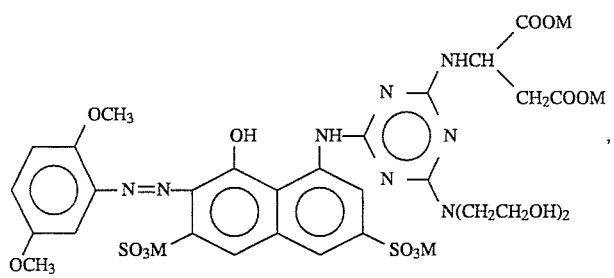
No. II-1

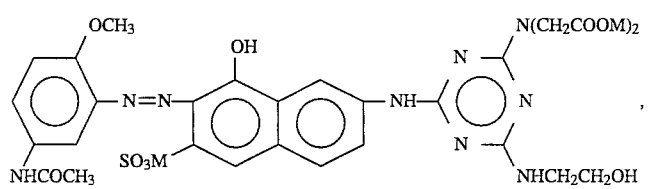
No. II-2

-continued
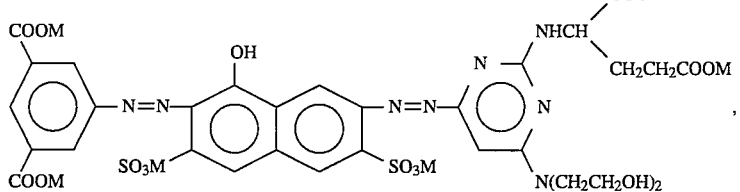 No. II-3
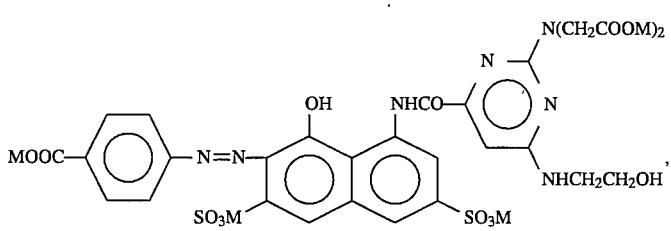 No. II-4
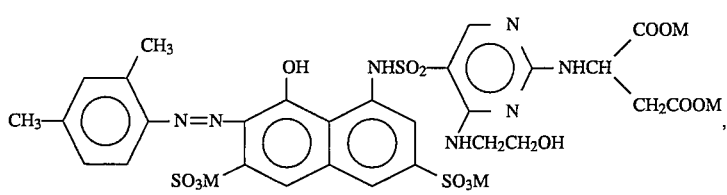 No. II-5
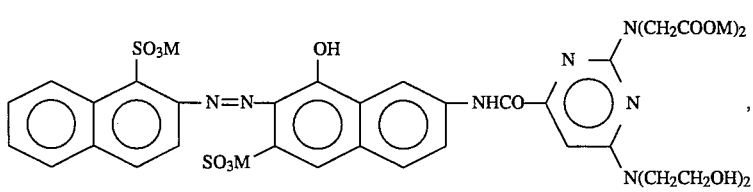 No. II-6
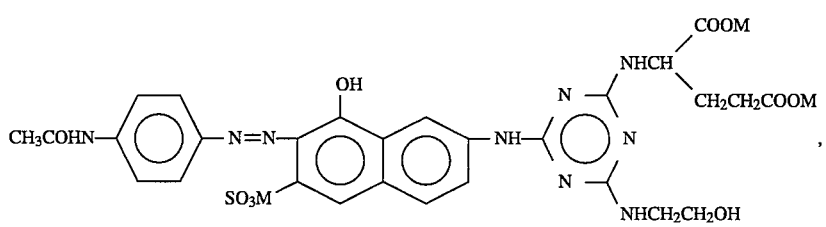 No. II-7
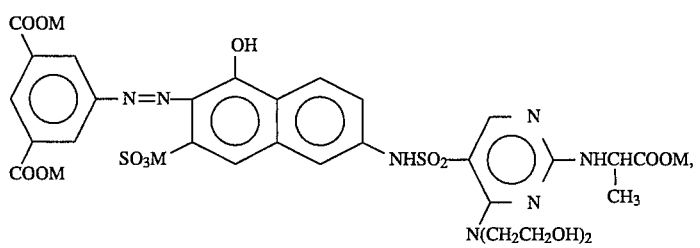 No. II-8
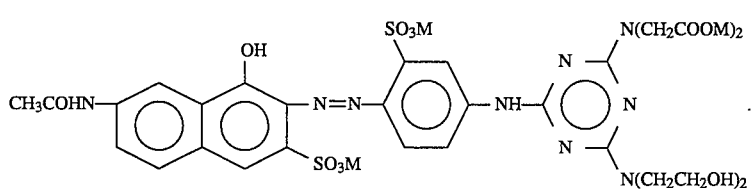 No. II-9

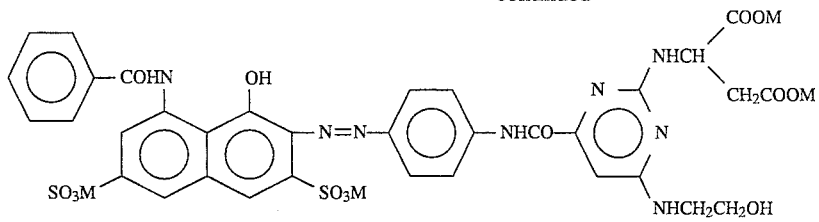

No. II-10 and

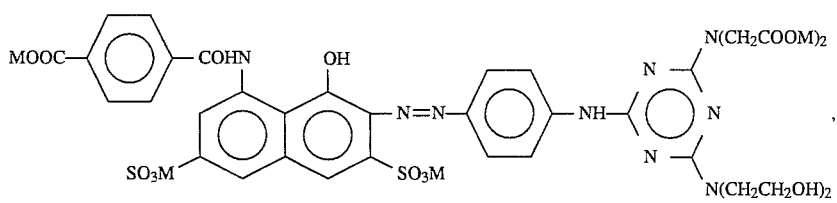

No. II-11 in which M is an alkali metal or an ammonium.

11. An ink comprising a recording agent and a liquid medium for dissolving or dispersing the recording agent therein, wherein the recording agent comprises a monoazo dye compound having a structural unit represented by the following formula in its molecule:

$$-Y-(R_4)R_5 \qquad [II]$$

wherein Y is a 6-membered ring containing 2 or 3 nitrogen atoms, $R_4$ is $-N(H)_m(CH_2CH_2OH)_{2-m}$, in which m is a number of 0 or 1, and $R_5$ is an amino acid residue containing a —COOM group, in which M is an alkali metal or an ammonium.

12. The ink according to claim 11, wherein Y is selected from the following group E:

Group E:

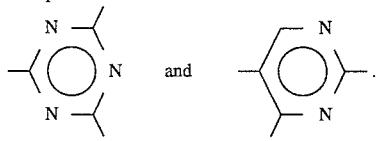

13. The ink according to claim 11, wherein the monoazo dye compound has 2 to 4 carboxyl groups and 1 or 2 sulfonic groups in its molecule.

14. The ink according to claim 11, wherein the recording agent comprises at least one compound selected from the group consisting following compounds II-1 to II-11:

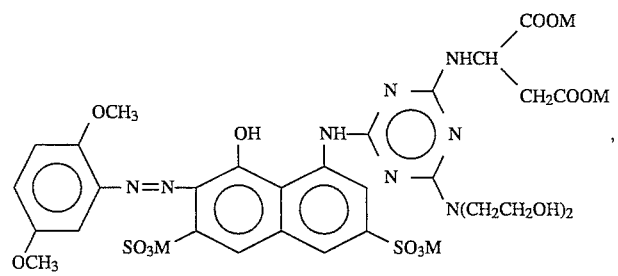

No. II-1

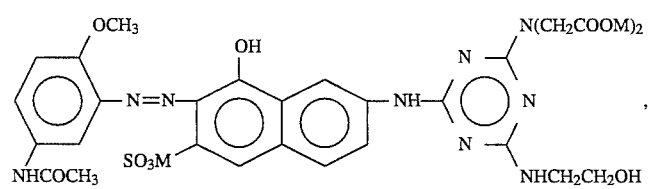

No. II-2

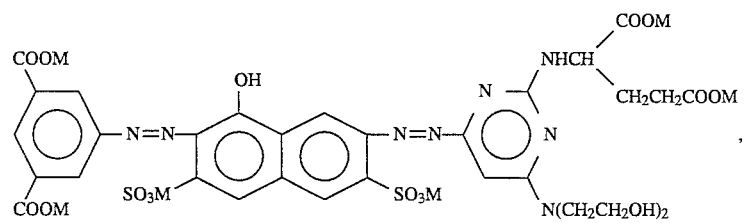

No. II-3

-continued
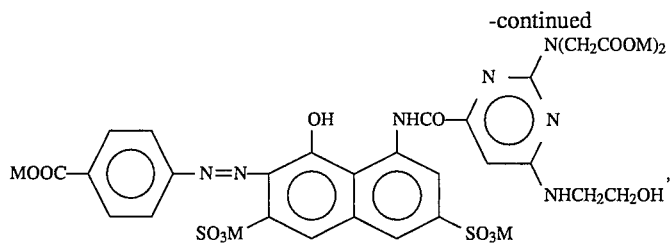 No. II-4
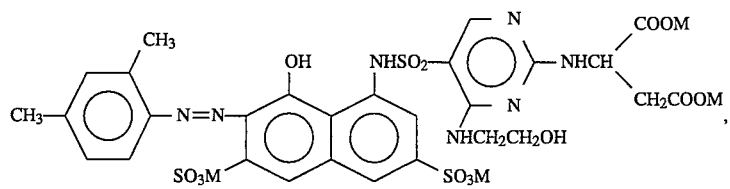 No. II-5
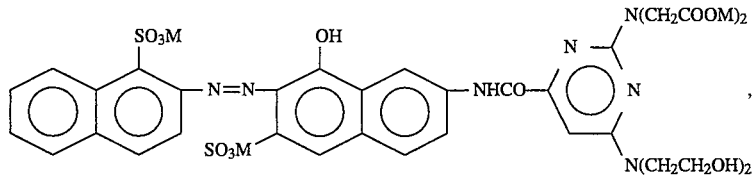 No. II-6
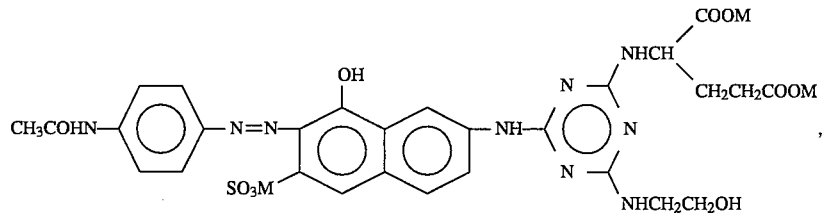 No. II-7
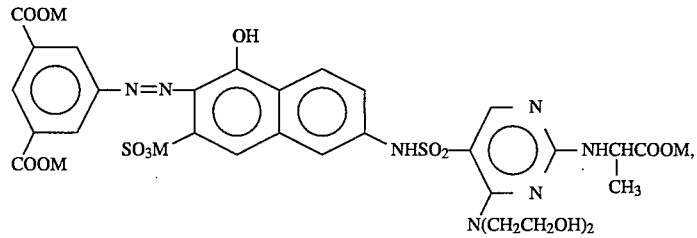 No. II-8
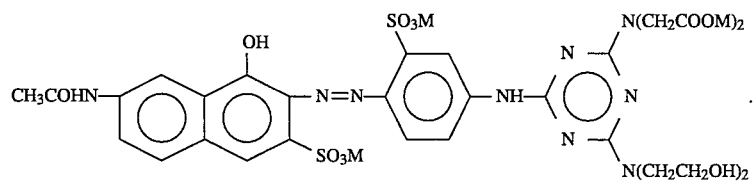 No. II-9
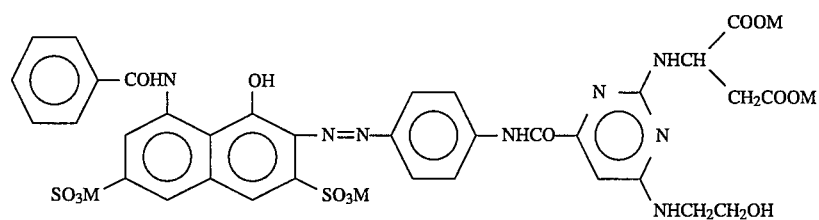 No. II-10
and

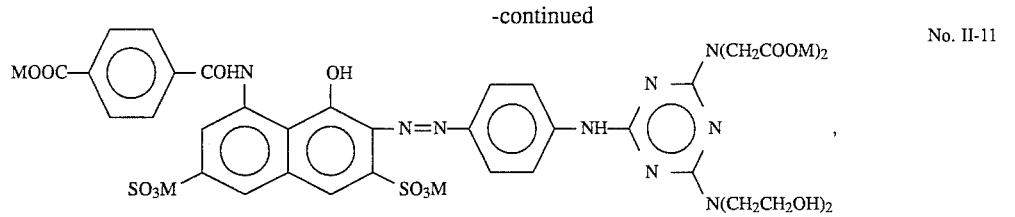
No. II-11 in which M is an alkali metal or an ammonium.

15. A disazo dye compound represented by the following general formula:

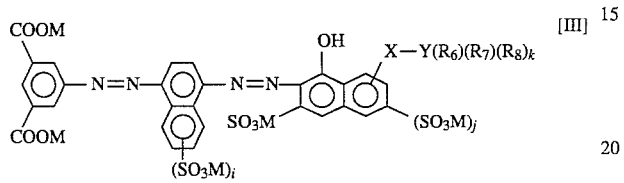 [III]

wherein Y is a 6-membered ring containing 2 or 3 nitrogen atoms, X is a linking group for bonding a main body of the dye molecule to Y, $R_6$ is $-N(H)_m(CH_2CH_2OH)_{2-m}$, in which m is a number of 0 or 1, $R_7$ is an atomic group selected from the following group FF, $R_8$ is another atomic group selected from the following group G, M is Na, K or ammonium, and i, j and k are individually a number of 0 or 1:

Group FF: H, OH, $NH_2$, CN, =O and $-N(H)_n(CH_2CH_2OH)_{2-n}$, in which n is a number of 0 or 1;

Group G: H, OH, $NH_2$, CN and =O.

16. The compound according to claim 15, wherein X is selected from the following group HH:

Group HH: $-NH-$, $-NHCO-$, $-NHCOCH_2CH_2-$ and $-NHSO_2-$.

17. The compound according to claim 15, wherein Y is selected from the following group II:

Group II:
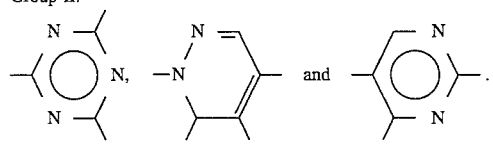

18. The compound according to claim 15, which is selected from the group consisting of the following compounds III-1 to III-7:

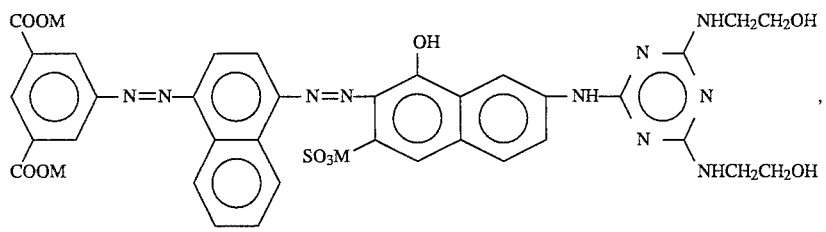
No. III-1

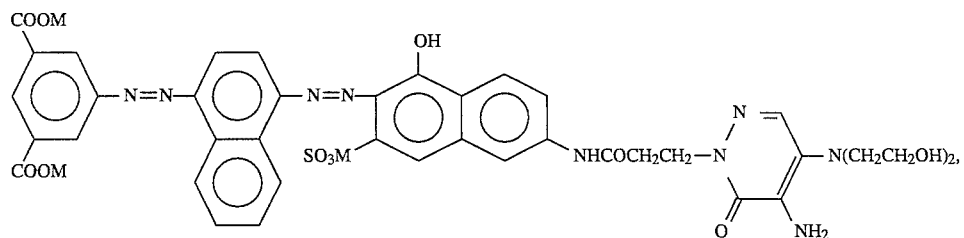
No. III-2

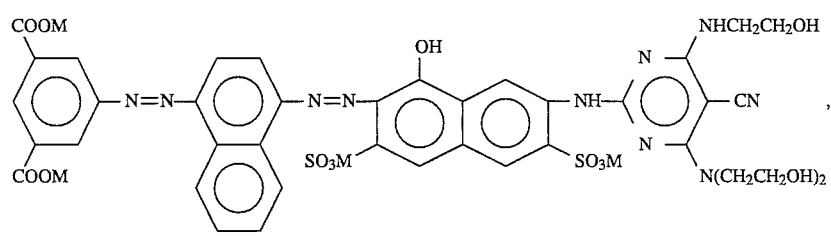
No. III-3

-continued

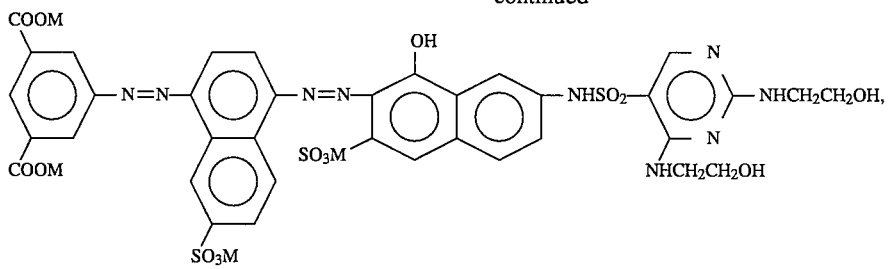
No. III-4

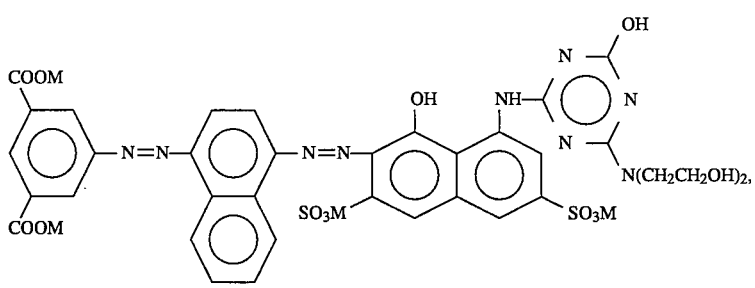
No. III-5

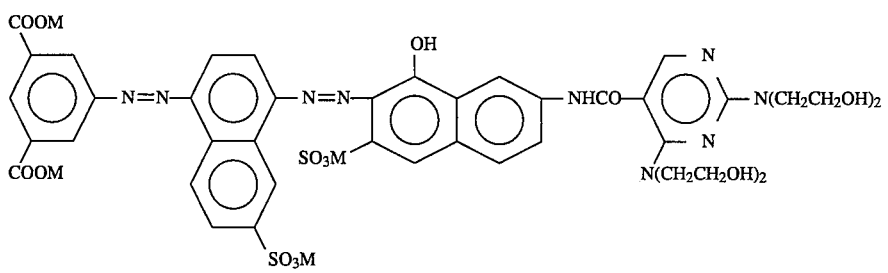
No. III-6 and

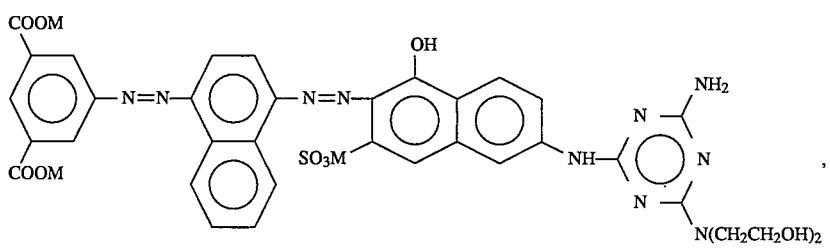
No. III-7 in which M is Na, K or ammonium.

19. An ink comprising a recording agent and a liquid medium for dissolving or dispersing the recording agent therein, wherein the recording agent comprises a disazo dye represented by the following general formula:

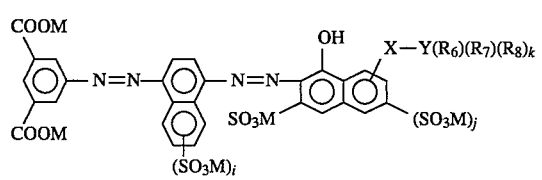  [III]

wherein Y is a 6-membered ring containing 2 or 3 nitrogen atoms, X is a linking group for bonding a main body of the dye molecule to Y, $R_6$ is $—N(H)_m(CH_2CH_2OH)_{2-m}$, in which m is a number of 0 or 1, $R_7$ is an atomic group selected from the following group FF, $R_8$ is another atomic group selected from the following group G, M is Na, K or ammonium, and i, j and k are individually a number of 0 or 1:

Group FF: H, OH, $NH_2$, CN, $=O$ and $—N(H)_n(CH_2CH_2OH)_{2-n}$, in which n is a number of 0 or 1;

Group G: H, OH, $NH_2$, CN and $=O$.

20. The ink according to claim 19, wherein X is selected from the following group HH:

Group HH: $—NH—$, $—NHCO—$, $—NHCOCH_2CH_2—$ and $—NHSO_2—$.

21. The ink according to claim 19, wherein Y is selected from the following group II:

Group II:

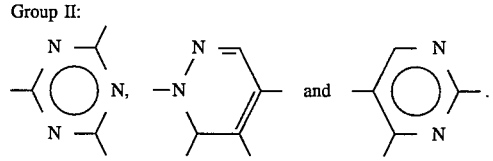

22. The ink according to claim 19, wherein the recording agent comprises at least one compound selected from the group consisting of the following compounds III-1 to III-7:

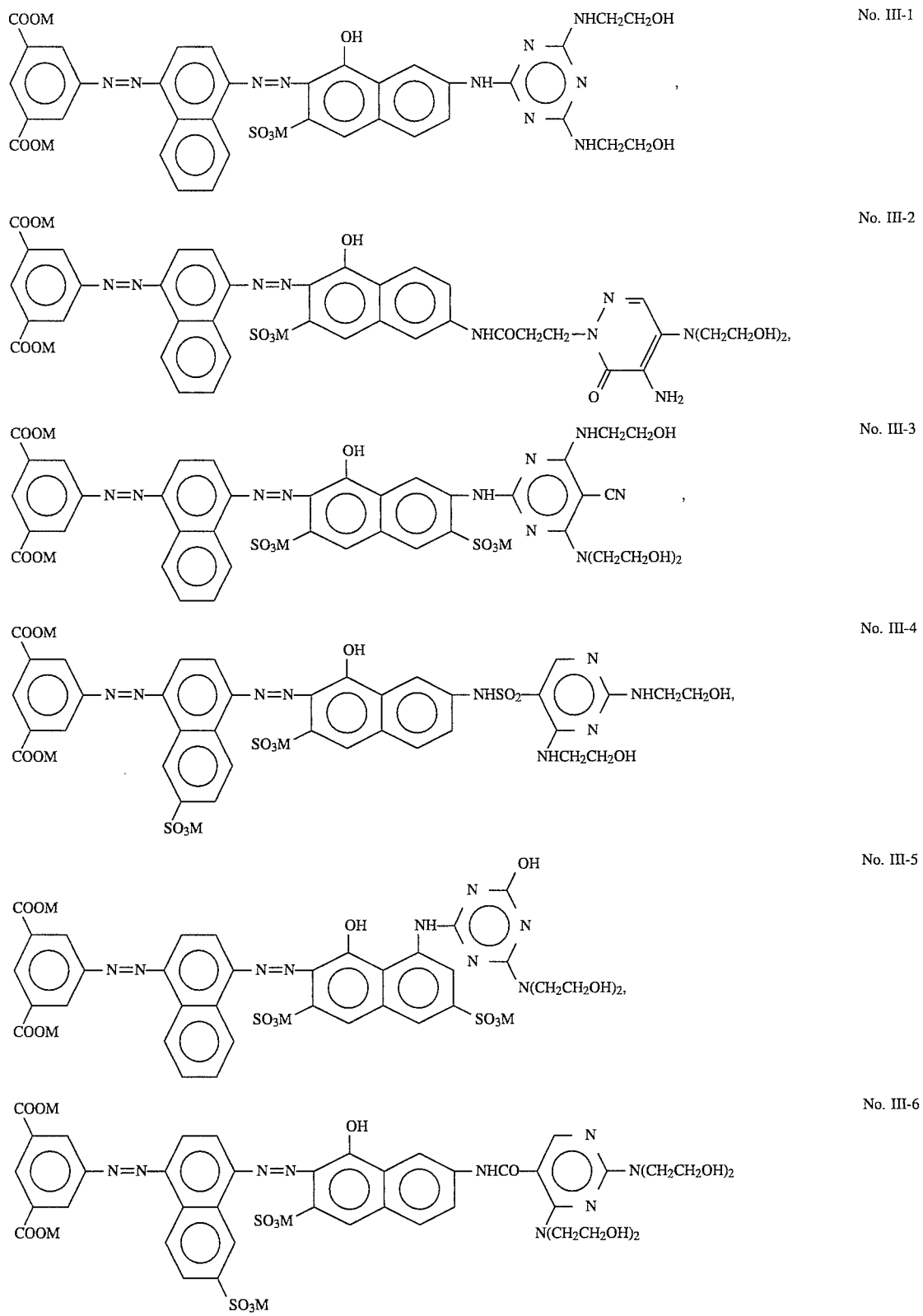
and

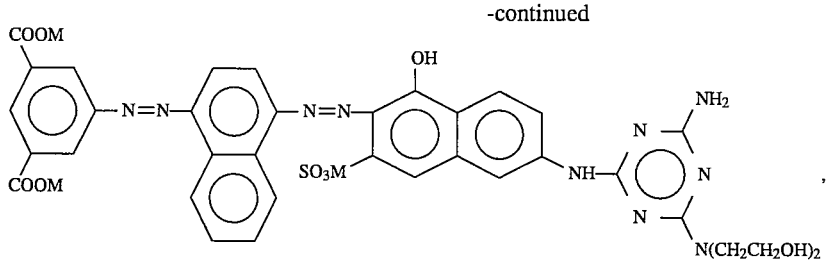

No. III-7 in which M is Na, K or ammonium.

23. A trisazo dye compound represented by the following general formula:

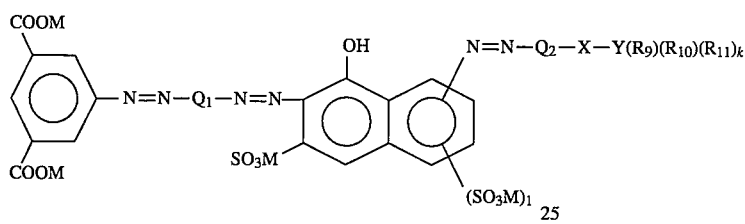

[IV]

wherein $Q_1$ is a p-phenylene group or 1,4-naphthylene group, each of which is unsubstituted or substituted by a group selected from the group consisting of $SO_3M$, COOM, $CH_3$, $OCH_3$, $NHCONH_2$ and $NHCOCH_3$, $Q_2$ is a p-phenylene group unsubstituted or substituted by a group selected from the group consisting of COOM, $CH_3$, $OCH_3$, $NHCONH_2$ and $NHCOCH_3$, Y is a 6-membered ring containing 2 or 3 nitrogen atoms, X is a linking group for bonding a main body of the dye molecule to Y, $R_9$ is $-N(H)_m(CH_2CH_2OH)_{2-m}$, in which m is a number of 0 or 1, $R_{10}$ is an atomic group selected from the following group J, $R_{11}$ is another atomic group selected from the following group KK, M is Na, K or ammonium, and k and l are individually a number of 0 or 1:

Group J: H, OH, $NH_2$, CN, =O and $-N(H)_n(CH_2CH_2OH)_{2-n}$, in which n is a number of 0 or 1;

Group KK: H, OH, $NH_2$, CN and =O.

24. The compound according to claim 23, wherein X is selected from the following group L:

Group L: —NH—, —NHCO—, —NHCOCH$_2$CH$_2$—
and —NHSO$_2$—.

25. The compound according to claim 23, wherein Y is selected from the following group M:

Group M:

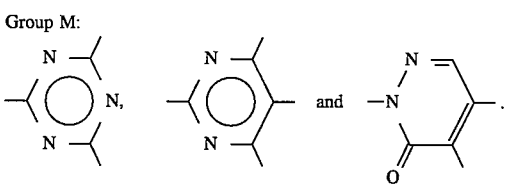

26. The compound according to claim 23, which is selected from the group consisting of the following compounds IV-1 to IV-7:

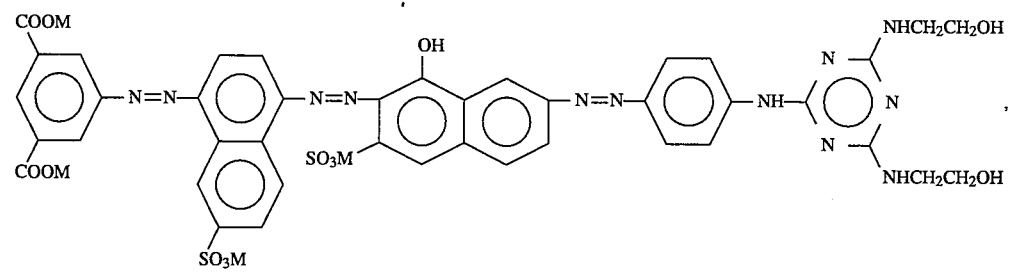

No. IV-1

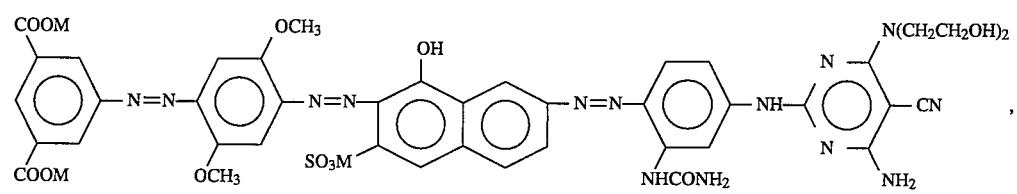

No. IV-2

-continued

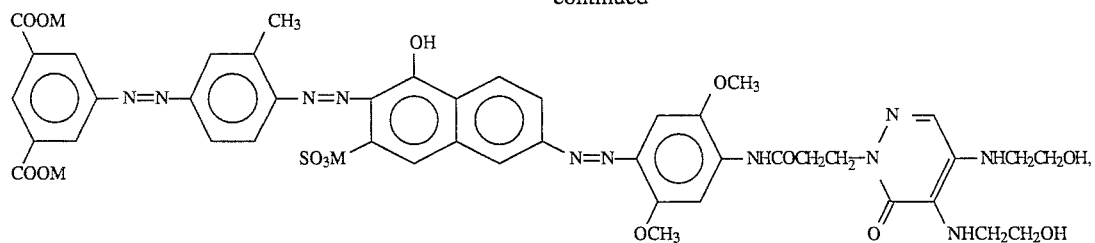
No. IV-3

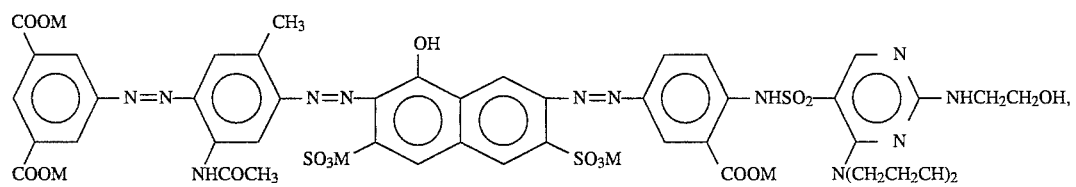
No. IV-4

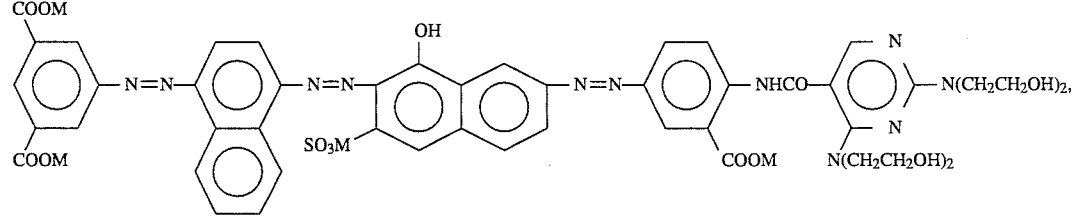
No. IV-5

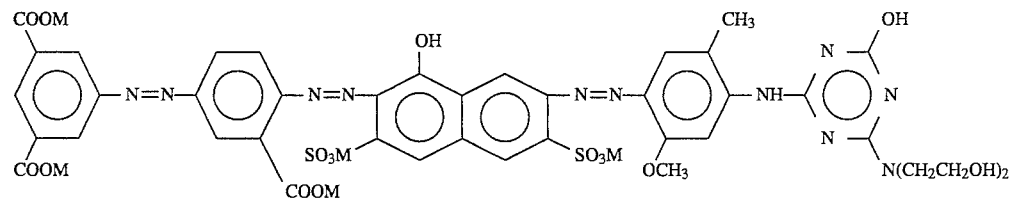
No. IV-6 and

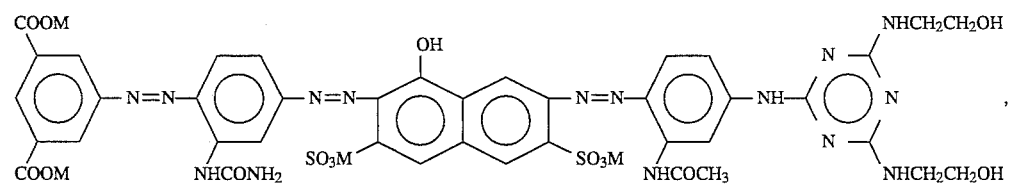
No. IV-7 in which M is Na, K or ammonium.

27. An ink comprising a recording agent and a liquid medium for dissolving or dispersing the recording agent therein, wherein the recording agent comprises a trisazo dye represented by the following general formula:

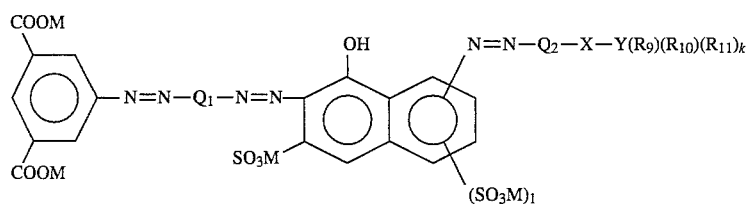
[IV]

wherein $Q_1$ is a p-phenylene group or 1,4-naphthylene group, each of which is unsubstituted or substituted by a group selected from the group consisting of $SO_3M$, COOM, $CH_3$, $OCH_3$, $NHCONH_2$ and $NHCOCH_3$, $Q_2$ is a p-phenylene group unsubstituted or substituted by a group selected from the group consisting of COOM, $CH_3$, $OCH_3$, $NHCONH_2$ and $NHCOCH_3$, Y is a 6-membered ring containing 2 or 3 nitrogen atoms, X is a linking group for bonding a main body of the dye molecule to Y, $R_9$ is $-N(H)_m(CH_2CH_2OH)_{2-m}$, in which m is a number of 0 or 1, $R_{10}$ is an atomic group selected from the following group J, $R_{11}$ is another atomic group selected from the following group KK, M is Na, K or ammonium, and k and l are individually a number of 0 or 1:

Group J: H, OH, $NH_2$, CN, =O and $-N(H)_n(CH_2CH_2OH)_{2-n}$, in which n is a number of 0 or 1;

Group KK: H, OH, $NH_2$, CN and =O.

28. The ink according to claim 27, wherein X is selected from the following group L:

Group L: —NH—, —NHCO—, —NHCOCH$_2$CH$_2$— and —NHSO$_2$—.

29. The ink according to claim 27, wherein Y is selected from the following group M:

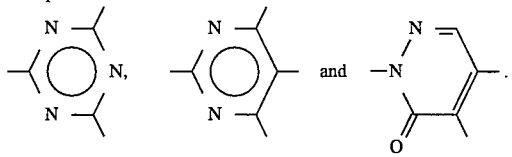

30. The ink according to claim 27, wherein the recording agent comprises at least one selected from the group consisting of the following compounds IV-1 to IV-7:

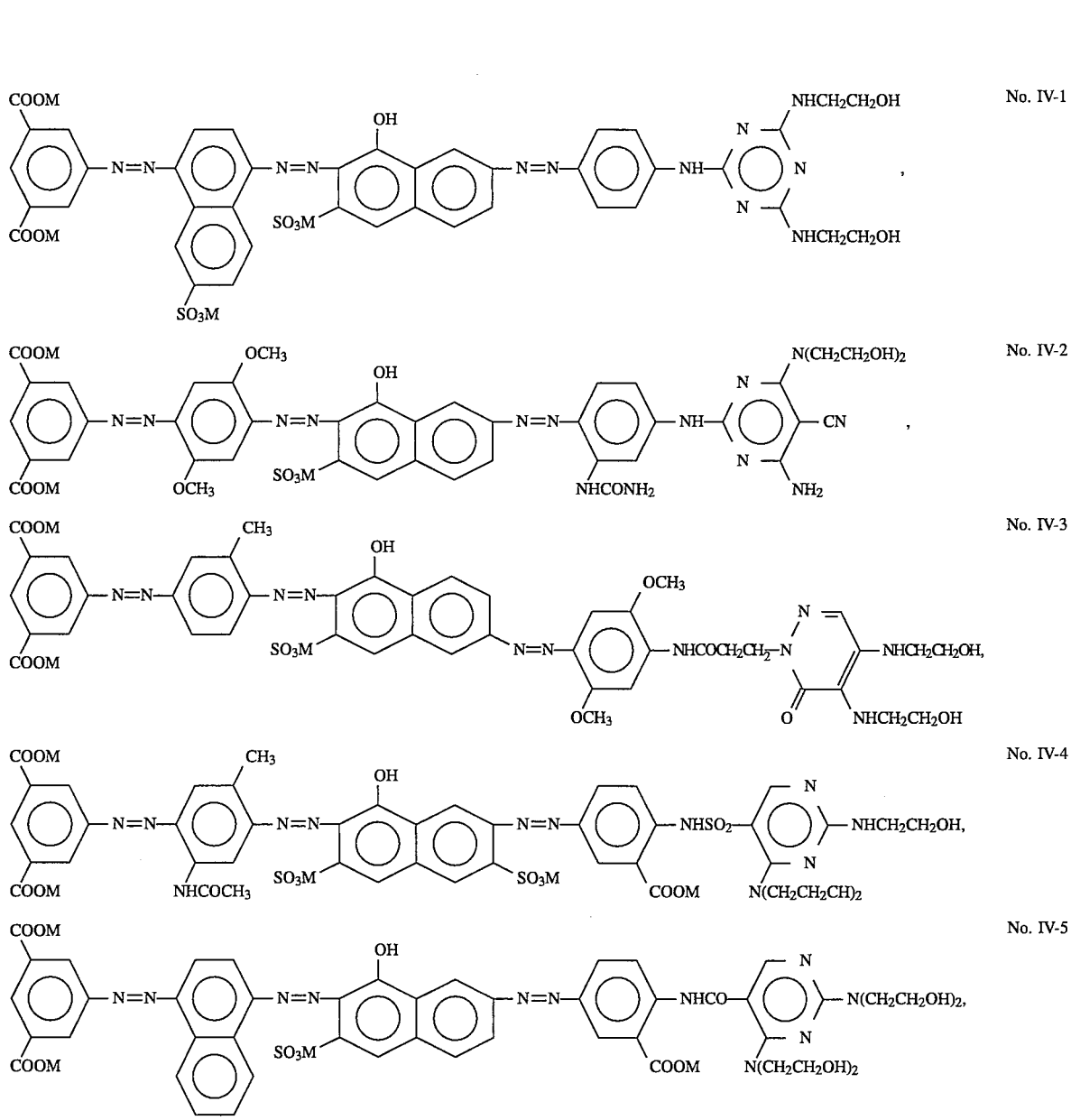

-continued

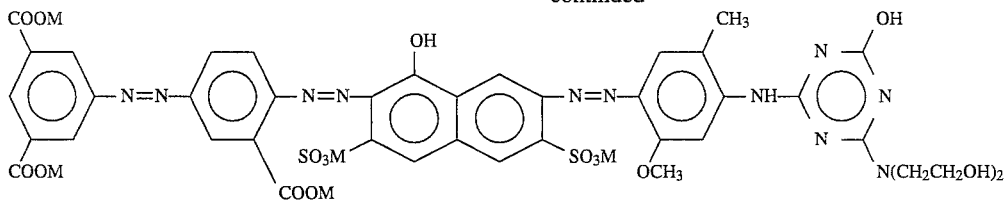
No. IV-6 and

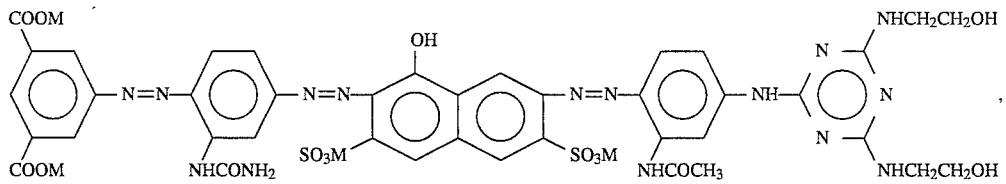
No. IV-7 in which M is Na, K or ammonium.

31. The ink according to any one of claims 2, 11, 19 and 27, wherein the pH of the ink ranges from 6 to 10.

32. The ink according to any one of claims 2, 11, 19 and 27, wherein the recording agent is contained in an amount of 0.1 to 15% by weight based on the total weight of the ink.

33. The ink according to any one of claims 2, 11, 19 and 27, wherein the liquid medium is a mixture of water and at least one water-soluble organic solvent.

34. The ink according to claim 33, wherein the water is contained in an amount of 10 to 97.5% by weight based on the total weight of the ink.

35. The ink according to any one of claims 2, 11, 19 and 27, which is suitable for use in ink-jet recording.

36. The ink according to claim 35, wherein the ink-jet recording is conducted in accordance with a system in which thermal energy is applied to the ink to eject droplets of the ink.

37. An ink-jet recording method comprising ejecting an ink in the form of ink droplets to make a record, wherein said ink is the ink according to any one of claims 2, 11, 19 and 27.

38. The ink-jet recording method according to claim 37, wherein the recording method is a method in which thermal energy is applied to the ink to eject the ink in the form of ink droplets.

39. A recording unit comprising an ink container portion with an ink held therein and a head from which the ink is ejected in the form of ink droplets, wherein said ink is the ink according to any one of claims 2, 11, 19 and 27.

40. The recording unit according to claim 39, wherein the recording head comprises a head which ejects ink droplets by applying thermal energy to the ink.

41. An ink cartridge comprising an ink container portion with an ink held therein, wherein said ink is the ink according to any one of claims 2, 11, 19 and 27.

42. An ink-let recording apparatus comprising a recording unit having an ink container portion with an ink held therein and a head from which the ink is ejected in the form of ink droplets, wherein said ink is the ink according to any one of claims 2, 11, 19 and 27.

43. The ink-jet recording apparatus according to claim 42, wherein the head comprises a head which ejects ink droplets by applying thermal energy to the ink.

44. An ink-jet recording apparatus comprising an ink cartridge having an ink container portion with an ink held therein, and a recording head from which the ink is ejected in the form of ink droplets, wherein said ink is the ink according to any one of claims 2, 11, 19 and 27.

45. The ink-jet recording apparatus according to claim 44, further comprising an ink feeder for feeding the ink held in the ink cartridge from the ink cartridge to the recording head.

46. The ink-jet recording apparatus according to claim 44, wherein the recording head comprises a head which ejects ink droplets by applying thermal energy to the ink.

47. The ink-jet recording apparatus according to claim 45, wherein the recording head comprises a head which ejects ink droplets by applying thermal energy to the ink.

* * * * *

UNITED STATES PATENT AND TRADEMARK OFFICE
CERTIFICATE OF CORRECTION

PATENT NO. : 5,466,282
DATED : November 14, 1995
INVENTOR(S) : Tsuyoshi EIDA et al.

It is certified that error appears in the above-indentified patent and that said Letters Patent is hereby corrected as shown below:

ON THE COVER PAGE

[56] References Cited

U.S. PATENT DOCUMENTS

"4,636,284  12/1986  Ohta et al." should read
--4,626,284  12/1986  Ohta et al.--.

COLUMN 1:
Line 42, "to store" should read --to be stored--.

COLUMN 2:
Line 14, "3-1576" should read --3-91576--.

COLUMN 12:
Line 55, "and the compound has 1 to 4 carboxyl groups" should be deleted; and
Line 56, "groups." should read --groups and the compound has 1 to 4 carboxyl groups.--.

COLUMN 27:
Line 51, "(60 lettersx40" should read --(60 letters x 40 lines--; and
Line 52, "paper on" should read --paper) on--.

UNITED STATES PATENT AND TRADEMARK OFFICE
CERTIFICATE OF CORRECTION

PATENT NO. : 5,466,282
DATED : November 14, 1995
INVENTOR(S) : Tsuyoshi EIDA et al.

It is certified that error appears in the above-indentified patent and that said Letters Patent is hereby corrected as shown below:

COLUMN 35:
Line 12, insert Table 8:

--

Table 8

| Evaluation item | Comparative Example No. | | | | | | | |
|---|---|---|---|---|---|---|---|---|
| | 6 | 7 | 8 | 9 | 10 | 11 | 12 | 13 |
| (a) | A | A | A | A | A | A | A | A |
| (b) | C | C | A | C | C | C | D | D |
| (c) | C | D | B | C | C | C | D | D |
| (d) | A | A | A | A | A | A | A | A |
| (e-1) | D | D | A | C | C | C | D | D |
| (e-2) | C | D | A | C | C | C | D | D |
| (e-3) | C | C | A | C | C | C | C | C |
| (f) | A | A | A | A | A | A | A | A |
| (g) | A | B | B | B | A | A | B | A |
| (h) | A | B | C | B | A | B | A | A |

--

COLUMN 54:
Line 35, "consisting" should read --consisting of the--; and

Comp. No. II-3, " 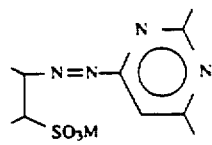 " should be -- 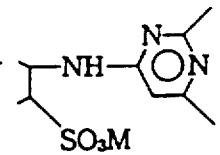 --

UNITED STATES PATENT AND TRADEMARK OFFICE
CERTIFICATE OF CORRECTION

PATENT NO. : 5,466,282          Page 3 of 3
DATED     : November 14, 1995
INVENTOR(S) : Tsuyoshi EIDA et al.

It is certified that error appears in the above-indentified patent and that said Letters Patent is hereby corrected as shown below:

<u>COLUMN 68</u>,
    Line 2, "one" should read --one compound--.

<u>COLUMN 70</u>,
    Line 25, "ink-let" should read --ink-jet--.

Signed and Sealed this

Twenty-third Day of April, 1996

Attest:

BRUCE LEHMAN

Attesting Officer    Commissioner of Patents and Trademarks